United States Patent [19]
Stich

[11] 3,967,173
[45] June 29, 1976

[54] TRANSISTOR BRIDGE INVERTER MOTOR DRIVE HAVING REDUCED HARMONICS

[75] Inventor: Frederick A. Stich, Milwaukee, Wis.

[73] Assignee: Allis-Chalmers Corporation, Milwaukee, Wis.

[22] Filed: Mar. 14, 1975

[21] Appl. No.: 558,497

[52] U.S. Cl.............................. 318/227; 318/230; 318/231; 321/4; 321/9 R
[51] Int. Cl.² .......................................... H02P 5/40
[58] Field of Search................... 318/227, 230, 231; 321/4, 9

[56] References Cited
UNITED STATES PATENTS

| | | | |
|---|---|---|---|
| 3,387,195 | 6/1968 | Piccand et al. | 318/227 |
| 3,538,420 | 11/1970 | Klein | 318/227 X |
| 3,585,488 | 6/1971 | Gutt et al. | 318/227 UX |
| 3,611,086 | 10/1971 | Mokrytzki et al. | 318/227 |
| 3,694,718 | 9/1972 | Graf et al. | 318/227 |

Primary Examiner—Gene Z. Rubinson
Attorney, Agent, or Firm—Lee H. Kaiser

[57] ABSTRACT

A harmonic reduced pulse width modulation, variable speed transistor bridge inverter drive controls frequency and magnitude of stator voltage applied to an induction motor so as to maintain constant flux in the motor and permit maximum driving torque to be realized from the motor over a wide speed range. An oscillator generates a train of clock pulses whose frequency is proportional to an analog speed signal, and a three phase generator derives three phase reference waves having periods which include a predetermined number of clock pulses. A resettable volt/hertz integrator derives a train of ramp pulses which are synchronized to the clock pulses and vary in magnitude as a function of the integral of the output voltage from the bridge inverter with respect to time. The constant volt/hertz ramp signals are compared to first and second reference voltages to derive phase-displaced first and second control pulses. The fundamental output voltages of individual phases of the bridge are regulated in accordance with respective three phase reference waves, and pulse width modulating means switch the transistors in the phases of the bridge by two different width pulses whose leading edges are established by the clock pulses and whose trailing edges are respectively at the first and at the second control pulses and in such a manner that the bridge inverter applies twelve-step voltages to the motor stator windings in which the fifth and seventh harmonics are substantially eliminated and in which the voltage-to-frequency ratio is controlled to maintain constant flux in the motor.

29 Claims, 27 Drawing Figures

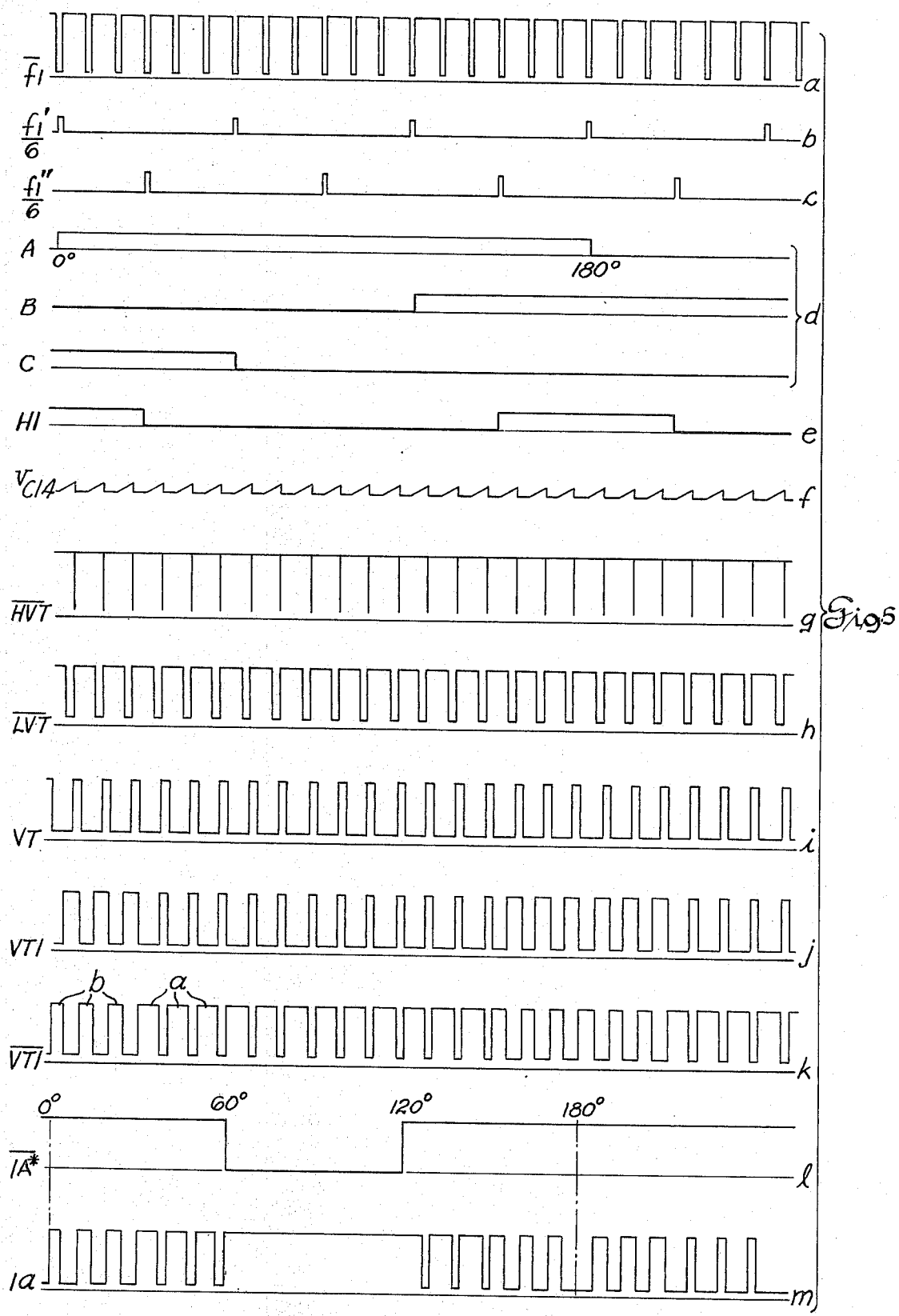

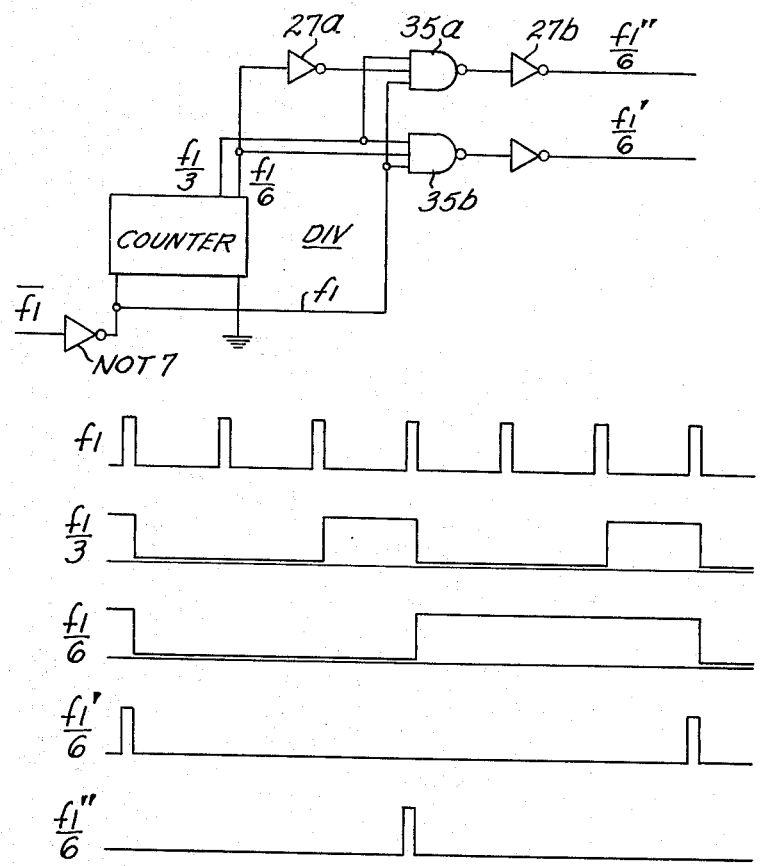
Fig. 8 — DIVIDE BY SIX COUNTER
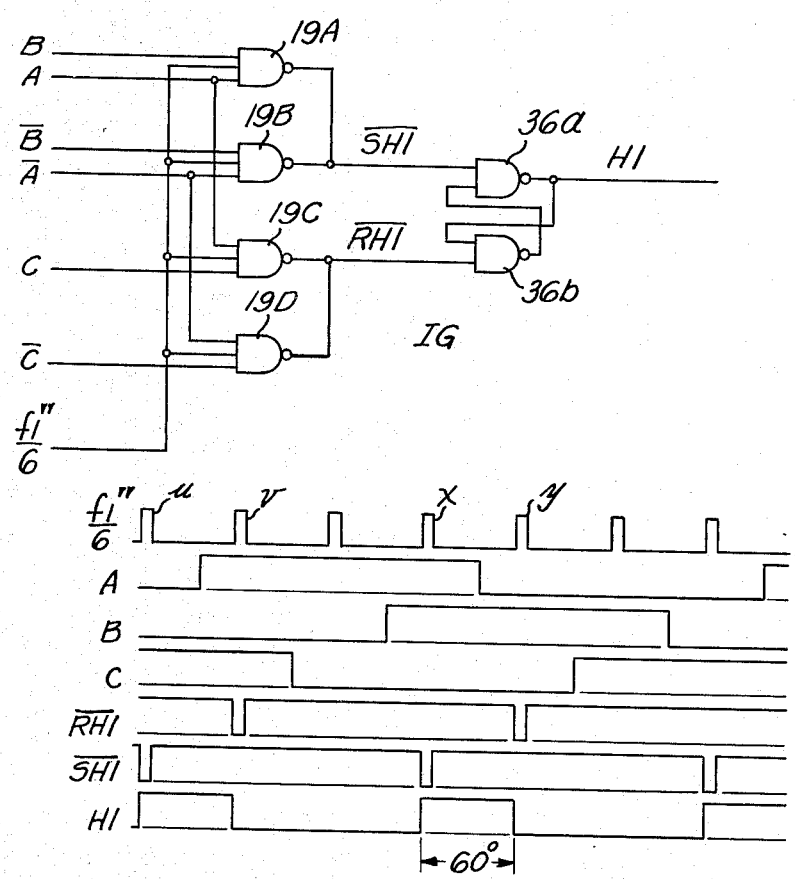
Fig. 10 — 60° INTERVAL GENERATOR

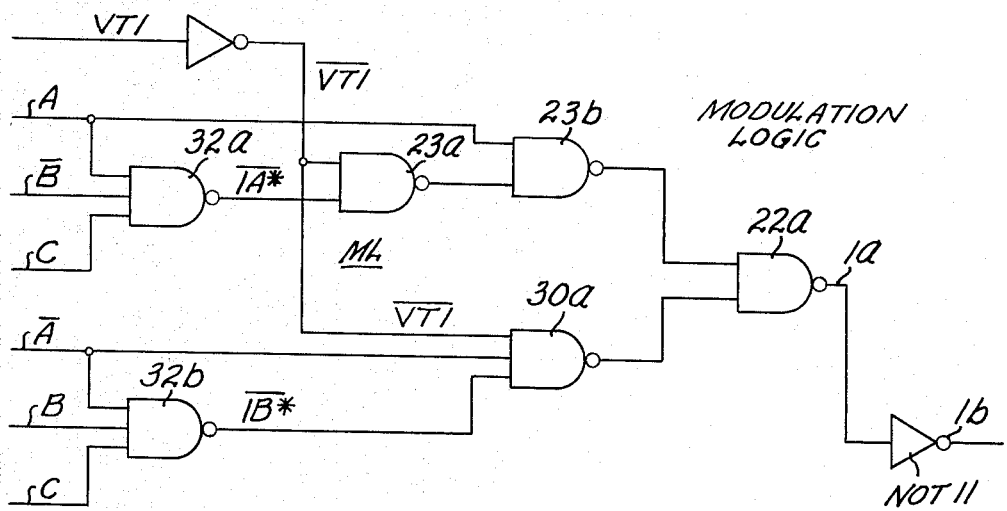
$$1a = (A)(\overline{1A^*} + \overline{VT1}) + (\overline{A})(\overline{1B^*} + \overline{VT1})$$
$$1b = (\overline{A})(1B^* + \overline{VT1}) + (A)(\overline{1A^*} + \overline{VT1})$$
$$1b = \overline{1a}$$
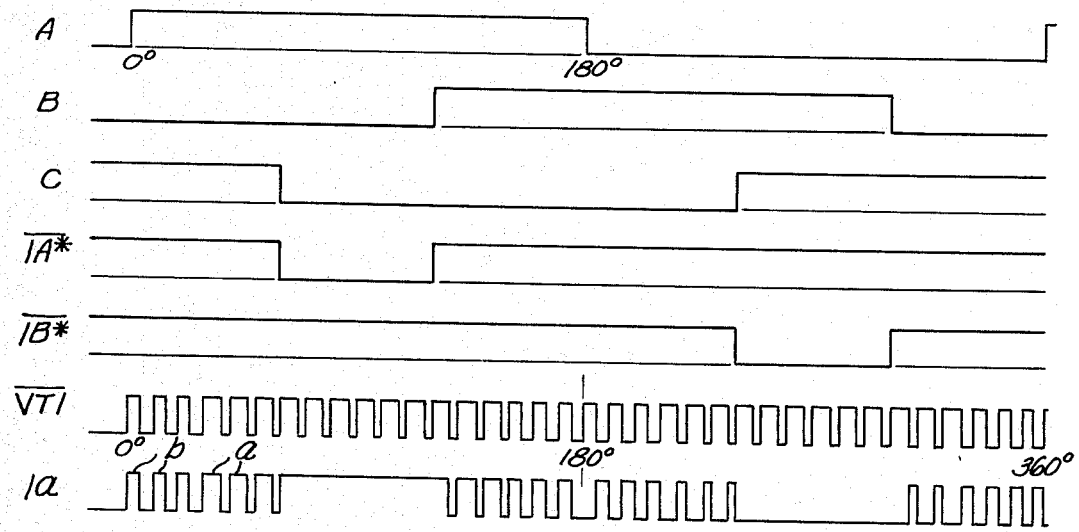
Fig.-12

TRANSISTOR BRIDGE INVERTER MOTOR DRIVE HAVING REDUCED HARMONICS

This invention relates to static electrical inverters and in particular to transistor bridge inverter drives of the PWM type for driving an induction motor.

BACKGROUND OF THE INVENTION

An a.c. motor does not require a commutator but is not generally regarded as a variable speed machine because its speed is a function of its applied frequency which is normally fixed. If variable frequency and variable voltage power is connected to a commutatorless a.c. motor, it is possible by control of the frequency and amplitude of the applied voltage to provide an efficient variable speed drive. With full rated voltage applied to the stator winding of an induction motor, its speed is nearly proportional to the frequency of the applied voltage and is practically independent of load. By controlling the frequency and amplitude of the stator voltage in such a manner as to maintain constant flux in an induction motor, it is possible to effect efficient variable speed control. With the voltage-to-frequency ratio controlled so as to maintain constant flux, the motor torque is determined by the slip frequency between the applied stator frequency and the output shaft frequency irrespective of motor speed.

The normal steady state operating range of an induction motor is over the portion of the torque/slip characteristic which has a positive slope. However, if the applied frequency and voltage can be controlled so as to keep the absolute slip frequency less than the pullout slip frequency, the machine can be made to operate on the most favorable portion of the torque/slip characteristic under all conditions so it is possible to realize the maximum driving torque of which the machine is capable at all speeds.

Solid state variable frequency and variable voltage power supplies of the cycloconverter type are used for variable speed control of induction motors, but the upper output frequency limit of a cycloconverter is usually less than that of the supply frequency, which places a practical limitation on the range of application for cycloconverter drive systems.

Solid state variable frequency power supplies using an a.c. to d.c. SCR converter followed by a variable frequency inverter are also known for variable speed control of an induction motor, but such systems have relatively low input power factor and relatively high percent of harmonics in the motor current which results in high motor losses and in torque oscillations.

D.c. to a.c. bridge inverter motor drives are known in which switching devices such as transistors connected in a bridge circuit with a d.c. source are selectively driven into conduction at a predetermined rate to convert, or chop the d.c. into a square-wave a.c. output. In these inverters it is customary to insert a filter after the inverter output when a sinusoidal output is desired. The filter extracts the sinusoidal fundamental component from the output which consists of fundamental plus harmonics. The filtering problem is extremely difficult in variable frequency power supplies since conventional filters have a fixed frequency characteristic, and the inverter may have a 20 to 1 frequency range.

OBJECTS OF THE INVENTION

It is an object of the invention to provide an improved polyphase pulse width modulation (PWM) inverter motor drive utilizing transistors to derive a voltage of adjustable frequency and magnitude for driving a three phase electrical motor.

It is a further object of the invention to provide such an improved PWM transistor bridge inverter drive which is capable of driving a fully loaded induction motor so that motor output torque is constant over a wide speed range. A still further object is to provide such an improved PWM bridge inverter drive for driving an a.c. motor which controls frequency and amplitude of the motor stator voltage so as to maintain constant flux in the motor and to keep the absolute slip frequency less than the pullout frequency at all speeds. Another object is to provide such an improved PWM transistor inverter drive which is adjustable to optimally drive the motor for best performance, i.e., constant rated torque below motor base speed and rated horsepower above base speed. A further object is to provide such an improved PWM transistor inverter motor drive which can be adjusted so that motor output torque is constant over the entire speed range.

A further object of the invention is to provide a transistor PWM bridge inverter, variable frequency and variable voltage power supply for driving a three phase motor which maintains constant flux in the motor over a wide speed range and has improved means to reduce harmonics in the current supplied to the motor.

Another object is to provide such a bridge inverter power supply which maintains constant flux in the motor and reduces harmonics in the motor currents and also provides low voltage-drop paths for reactive current during the intervals between power pulses.

A still further object is to provide such a PWM transistor bridge inverter, variable frequency and variable voltage power supply for driving a three phase motor which prevents oscillation of the motor and also reduces heating of the motor in comparison to prior art variable frequency static power supplies.

Another object of the invention is to provide an improved PWM transistor bridge inverter, variable frequency and variable voltage power supply for driving an electrical motor which controls the voltage-to-frequency ratio so as to maintain constant flux in the motor over a wide speed range and wherein the transistor chopping frequency is substantially lower than the clock pulse frequency which establishes the PWM pulse period.

Still another object is to provide such an improved transistor inverter variable frequency and variable voltage power supply for driving an induction motor wherein transistor chopping is minimized at the portion of each half cycle of the fundamental wherein the transistors will conduct peak current during machine loading.

A further object is to provide such an improved PWM transistor inverter, variable frequency power supply for driving an induction motor which reduces the number of switching operations that must occur to time ratio control switch the output voltage of the inverter so as to maintain flux constant in the motor and to neutralize harmonics in the motor current while maintaining low voltage-drop paths for inductive current in between applied voltage pulses.

SUMMARY OF THE INVENTION

A harmonic-reduced, variable frequency and variable voltage transistor bridge inverter drive of the PWM chopper type controls frequency and amplitude of stator voltage applied to an induction motor so as to maintain constant flux in the motor and operate the motor on the most favorable portion of its torque-slip characteristic under all conditions, thereby permitting motor output torque to be constant over a wide speed range. The motor drive includes a three phase bridge inverter with first and second transistors in each phase of the bridge connected in series across a d.c. source and also includes an oscillator for generating a train of clock pulses when frequency is a function of the magnitude of an analog speed signal. A resettable volt/hertz integrator senses the output voltage of the inverter and derives a train of ramp pulses synchronized to the clock pulses whose magnitude varies as a function of the integral of the inverter output voltage with respect to time, and the ramp pulses are compared to first and second reference voltages to derive phase-displaced first and second control pulses. A three phase generator derives three phase reference waves having periods which include a predetermined number of clock pulses and which are associated with individual phases of the bridge. The fundamental output voltage of individual phases of the bridge are regulated in accordance with the three phase reference waves, and pulse width modulating means switch transistors in respective phases of the bridge by variable width pulses whose leading edges are established by the clock pulses. The pulse width modulating means terminate PWM voltage pulses conducted by the transistors in the respective bridge phases at the first and at the second control pulses in such a manner that the bridge inverter generates a wave form approximating a twelve-step output wave in which fifth and seventh harmonics are substantially reduced. Only two different width PWM pulses are required to accomplish a two-state voltage-to-frequency ratio which maintains constant flux in the motor and reduces harmonics in the current supplied to the motor.

In the preferred embodiment an interval generator derives three trains of 60° width, step controlling pulses which span respective zero crossings of the corresponding phase reference waves, and a volt-second switch derives for each bridge inverter phase a train of duty cycle regulating pulses whose leading edges are respectively at the first control pulse when the step controlling pulse is absent and at the second control pulse when the step controlling pulse is present and whose trailing edges are at the succeeding clock pulse. Modulation logic means generate trains of transistor switching pulses for switching the first and second transistors in each bridge phase in opposition so that the first transistor follows the complement of said duty cycle regulating pulses during the positive half cycle of the corresponding phase reference wave in order to apply power pulses to the motor and follows said duty cycle regulating pulses during the negative half cycle of the corresponding phase reference wave to provide paths for "free-wheeling" pulses, i.e., low voltage-drop paths for reactive current pulses in between the power pulses.

DESCRIPTION OF THE DRAWINGS

These and other objects and advantages of the invention will be more readily apparent from the following detailed description when considered in conjunction with the accompanying drawings wherein:

FIGS. 5a through 5m illustrate pulses which are derived at different points in the bridge inverter motor drive shown in FIG. 1;

FIG. 8 shows the divide-by-six counter of the FIG. 1 motor drive and the trains of timing pulses generated thereby;

FIG. 10 illustrates the portion of the 60° interval generator of the FIG. 1 apparatus for phase one of the bridge inverter and the 60° width pulses generated thereby;

FIG. 12 shows the portion of the modulation logic for phase one of the bridge inverter motor drive shown in FIG. 1.

DETAILED DESCRIPTION

Figure 1:
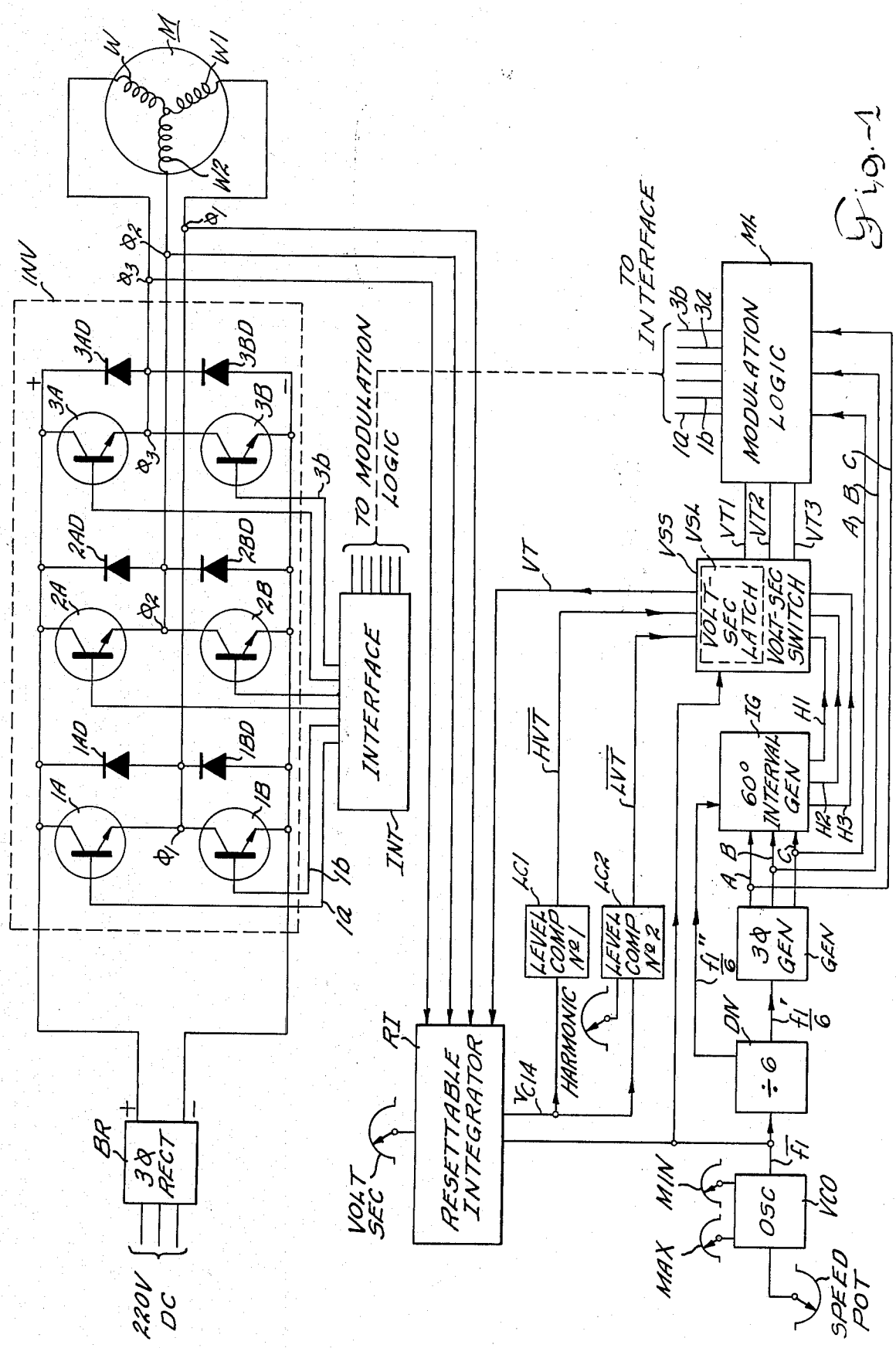
FIG. 1 is a block diagram of a variable frequency and variable voltage power supply for a three phase a.c. motor embodying the invention.

Referring to the schematic block diagram of FIG. 1, the PWM transistor inverter motor drive of the invention supplies voltage of adjustable frequency and adjustable magnitude to drive and control speed of a three phase induction motor M having Y-connected phase windings W1, W2 and W3. Power from a suitable alternating current supply such as a three phase, 220 volt source may be rectified in a full wave bridge rectifier BR to provide unidirectional power of potential E such as 300 volts to a twelve-step, six-element three phase transistor bridge inverter INV. Bridge inverter INV has a pair of power transistors in each leg connected in series between the 300 volts positive supply bus + and the zero voltage reference bus —.

One leg of inverter bridge INV includes a pair of power transistors 1A and 1B with their collector-emitter paths connected in series between the 300 volt positive bus + and the zero voltage reference bus — and with the node between transistors 1A and 1B consituting phase one output terminal $\phi_1$ connected to phase winding W1 of motor M. Transistors 1A and 1B have uncontrolled feedback, or clamping diodes 1AD and 1BD respectively connected in parallel with them in a reverse polarity relationship to provide a path for reactive load current and limit reverse voltages when the power transistors are turned off.

Similarly, leg two of bridge inverter INV includes a pair of power transistors 2A and 2B having their emitter-collector paths connected in series across the positive bus + and zero reference bus — with the node between the two transistors constituting phase two output terminal $\phi_2$ coupled to phase winding W2 of motor M. Feedback diodes 2AD and 2BD respectively are connected in parallel reverse polarity relationship with transistors 2A and 2B. In a similar manner leg three of bridge inverter INV includes power transistors 3A and 3B having their emitter-collector paths connected in series across the positive bus + and reference bus — with the node between the transistors constituting phase three output terminal $\phi_3$ connected to phase winding W3 of motor M. Power transistor 3A has a feedback diode 3AD connected in inverse polarity shunt relation therewith, and power transistor 3B also has a feedback diode 3BD connected in inverse polarity shunt relation therewith. It will be noted that transistors 1A–3C are arranged in the three legs for three phase inversion.

Each inverter bridge output terminal $\phi_1$, $\phi_2$ and $\phi_3$ can be selectively connected to either the positive bus + through a respective transistor 1A, 2A, or 3A or to the zero reference bus — through a respective transistor 1B, 2B, or 3B, and in operation the transistors in a given leg are switched in opposition so that when one transistor, such as 1A, is turned on the other, such as 1B, is turned off. Such inverters are well known and their manner of operation may be found in the Bedford and Hoft text Principles of Inverter Circuits.

GENERAL THEORY OF HARMONIC REDUCTION

Figure 2A:
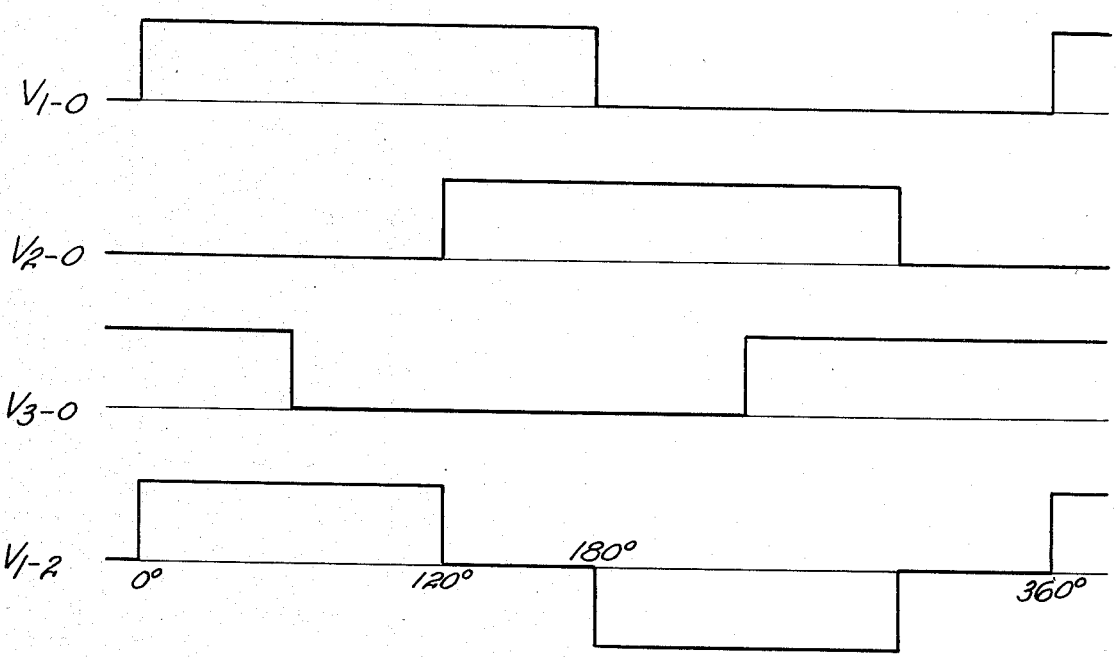
FIG. 2a shows the output voltages from a conventional three phase bridge inverter and FIG. 2b illustrates twelve-step approximate output voltages from inverter INV shown in FIG. 1 and wherein harmonics are substantially reduced in comparison to the waveforms of FIG. 2a (the reference wave A not being shown to scale)
Figure 13:
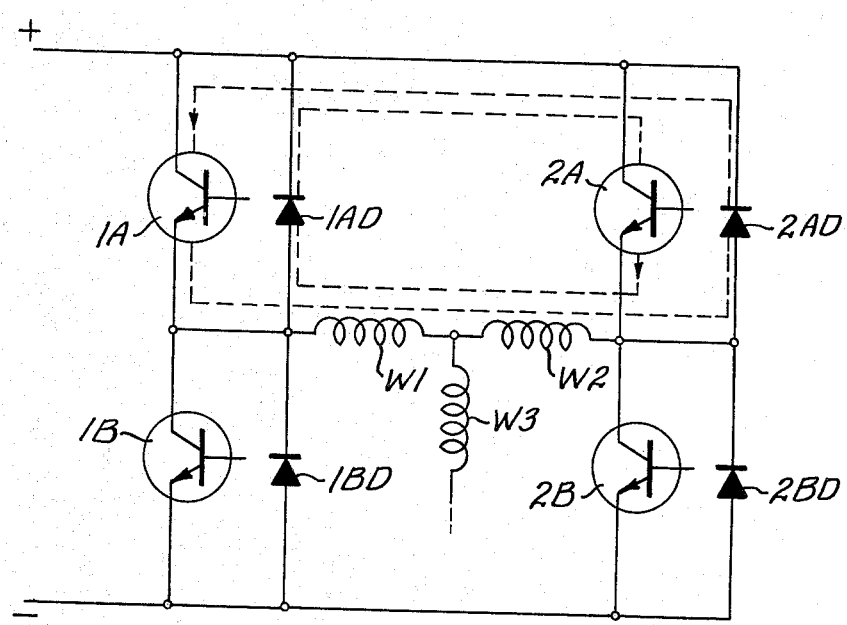
FIG. 13 shows a current path for free-wheeling pulses through two phases of the bridge inverter and associated motor windings.

Before describing the time ratio control which selectively regulates turning of the six transistor 1A through 3C of bridge inverter INV on and off, it may be useful to describe the underlying theoretical considerations of the instant invention. A three phase bridge inverter such as INV when controlled in the conventional manner will inherently apply a six-step square wave such as shown in FIG. 2a across the terminals of motor M. Power is applied to motor M when a transistor in one leg coupled to the positive bus +, such as 1A, (see FIGS. 1 and 13) and a diagonally opposed transistor in another leg connected to the zero reference bus —, such as 2B, are turned on simultaneously so that a path is completed from the positive bus + through 1A in series with winding W1, winding W2, and transistor 2B to the reference bus —, thereby applying line-to-line voltage to the motor M. The waveforms designated $V_{1-0}$, $V_{2-0}$ and $V_{3-0}$ represent respectively the voltage between the corresponding phase output terminals $\phi_1$, $\phi_2$, $\phi_3$ and the zero reference bus when the inverter is controlled in the conventional manner, and the waveforms $V_{1-2}$, $V_{2-3}$, and $V_{3-1}$ represent the respective line-to-line voltages between these inverter output terminals. A line-to-reference bus voltage such as $V_{1-0}$ is the resultant of conduction by the transistors 1A and 1B of the corresponding phase lege. The line-to-line voltage such as $V_{1-2}$ shown in FIG. 2(a) is derived from combining the corresponding pair of line-to-reference voltage waveforms such as $V_{1-0}$ and $V_{2-0}$, observing proper polarity, and alternates from positive to negative in the form of pulses which extend for two periods of 120 electrical degrees. When the inverter is operated in the conventional manner, the phase of the resultant line-to-line voltage such as $V_{1-2}$ is shifted relative to the phase of the line-to-reference bus voltages $V_{1-0}$ and $V_{2-0}$. The line-to-line voltages do not contain even or triplen harmonics but do contain high percentages of the other odd harmonics such as the fifth, seventh, and eleventh. The fundamental component of the line-to-line voltage produces the motor torque, whereas the harmonics result in undesired torque pulsations and motor heating and inverter heating.

The induction motor current produced by a nonsinusoidal voltage such as rectangular wave $V_{1-2}$ shown in FIG. 2a is very rich in harmonics because the harmonics do not see the same motor impedance as the fundamental. The fundamental voltage sees the rotor resistance $r_2$ transformed by the slip $s$ in the relationship $r_2/s$. The slip is a number rarely exceeding 0.05. However, because they are nonsynchronous, the harmonics see an impedance identical to a machine with a stalled motor wherein slip approaches unity. This is particularly significant at lower frequencies where the equivalent reactances are small. The fifth harmonic in the line-to-line voltage waveform $V_{1-2}$ shown in FIG. 2a is approximately 21% of the fundamental and the seventh harmonic is approximately 14% of the fundamental. Current harmonics at low motor speeds are higher than this and contribute significantly to motor heating and to torque pulsations.

If additional steps are added to the waveforms so that they approach closer to being sinusoidal, the relative height and width of the steps can be controlled to cancel harmonics. If transistors 1A through 3B are controlled so that inverter INV generates the stepped line-to-reference bus voltages such as $V_{1-0}$ and $V_{2-0}$ shown in FIG. 2b which when added result in the twelve-step line-to-line voltages such as $V_{1-2}$, the fifth and seventh harmonics are eliminated. It will be noted that such average line-to-reference bus voltages $V_{1-0}$ and $V_{2-0}$, shown in FIG. 2(b), have peak magnitude between 30° and 150° of the fundamental; 30° steps of 0.732 times peak beginning at 0° and at 150°; and 30° steps of 0.268 times peak prior to the 0° point and subsequent to the 180° point of the fundamental. In accordance with the invention, the additional steps of the twelve-step line-to-line output waveform such as $V_{1-2}$ from bridge inverter INV are produced by changing the width of the chopping pulses which turn on transistors 1A through 3B of bridge inverter INV.

Figure 2B:
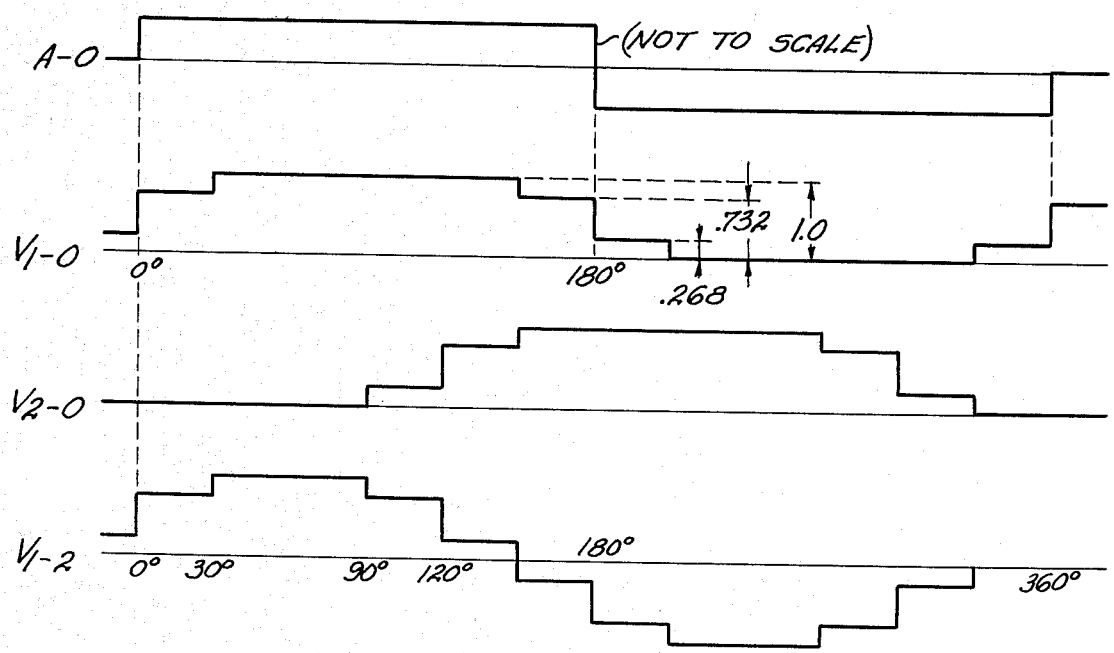
Figure 3:
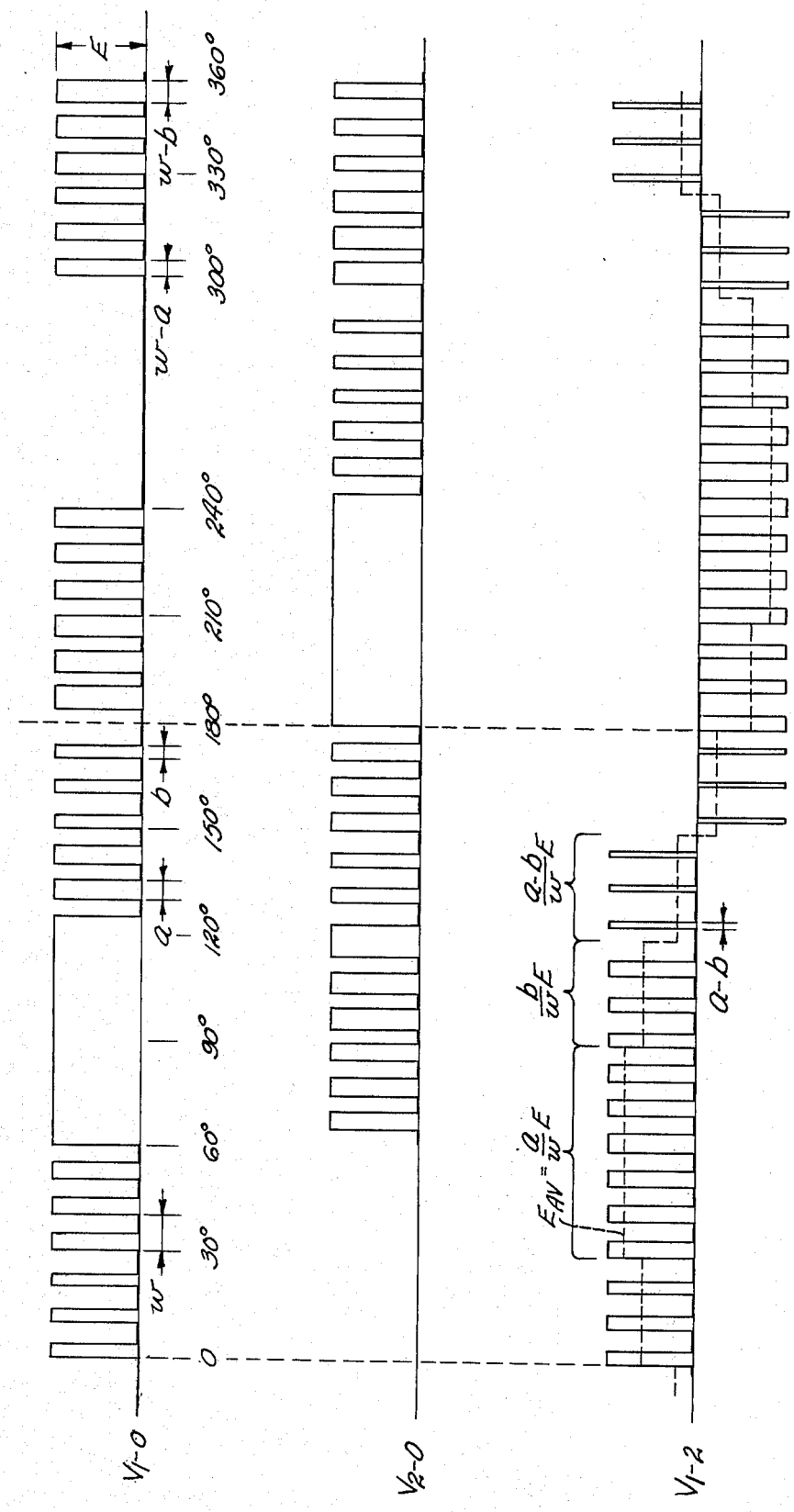
FIG. 3 illustrates typical reduced harmonic patterns of PWM pulses generated by the transistor bridge inverter motor drive of FIG. 1 to provide selectively variable frequency and variable voltage to the motor.

FIG. 3 illustrates the reduced harmonic phase-to-reference bus PWM waveforms $V_{1-0}$ and $V_{2-0}$ derived by pulse width modulating respectively transistors 1A and 1B of phase one and 2A and 2B of phase two of inverter INV and also shows the resultant line-to-line reduced harmonic PWM waveform $V_{1-2}$ which will produce the twelve-step average voltage waveform having the same designation in FIG. 2(b). The twelve-step average voltage waveform $V_{1-2}$ is shown in dotted lines in FIG. 3 superimposed upon the PWM pulse waveform which produces it. It will be noted that, in addition to the angular displacement of the switching points, the only parameter that need be regulated to obtain fifth and seventh harmonic reduction is to utilize two different width pulses $a$ and $b$ for turning on the transistors, where the ratio of $b/a$ is 0.732 and the peak magnitude $E_{AV}$ of the twelve-step average voltage waveform is equal to $a/w$ times E, where $w$ is the pulse period and E is the potential of d.c. source BR. It should also be noted that certain pulses in the line-to-line PWM waveform $V_{1-2}$ resulting from combining the line-to-reference bus voltages are of width $(a-b)$. Further, the line-to-reference bus PWM waveforms such as $V_{1-0}$ and $V_{2-0}$ have pulses of 60° duration wherein one transistor such as 1A has maximum duty and also provides a low voltage-drop path for "free-wheeling" pulses in between power pulses as described hereinafter.

GENERAL DESCRIPTION OF BLOCK DIAGRAM

Referring to FIG. 1, a speed potentiometer SPEED POT which is set by the operator to provide desired speed of motor M may derive a unidirectional analog speed control voltage whose magnitude is a function of the position of the potentiometer wiper. The speed control signal from potentiometer SPEED POT is converted from an analog voltage level to a variable frequency train of clock pulses $f1$ by a voltage controlled oscillator VCO. The frequency of the $f1$ pulses (see FIGS. 5a and 6) from oscillator VCO is proportional to the magnitude of the speed signal voltage and is the master clock frequency which determines the frequency of the PWM power pulses applied to motor windings W1, W2, and W3. Also, the PWM pulse period is established by the interval between $f1$ clock pulses. The $f1$ pulse train is converted by a two phase divide-by-six frequency divider DIV into two timing pulse trains $f1'/6$ and $f1''/6$ (see FIGS. 5b and 5c) that are 180° phase displaced. The pulse train $f1'/6$ is the clock frequency for a three phase generator GEN which derives an unmodulated set of three phase reference square waves A, B and C (shown in FIG. 5d) which are displaced 120° from each other and establish the fundamental frequency of the inverter output voltages. Six $f1'/6$ pulses are required to generate each 360 electrical degrees of the three phase set of reference square waves A, B, C. Consequently, clock pulses $f1$ are generated by oscillator VCO at 36 times motor frequency, and each full cycle of line-to-line reference bus voltages $V_{1-0}$, $V_{2-0}$, and $V_{3-0}$ contains 36 PWM pulse periods each of which is equal to the interval between successive $f1$ clock pulses.

The PWM three phase bridge inverter INV controls the voltage-to-frequency (volt/second) ratio of the motor stator voltages applied to motor windings W1, W2, W3 so as to obtain substantially constant flux in induction motor M, thereby permitting motor M to operate on the most favorable portion of its torque/slip characteristic at all motor speeds. A volt-second feedback control circuit for providing constant flux in motor M includes a resettable integrator RI which senses and integrates the three phase motor stator voltages applied by bridge inverter INV to motor phase windings W1, W2, W3 and also includes two level comparators LC1 and LC2. The output terminals $\phi_1$, $\phi_2$, $\phi_3$ of inverter bridge INV are coupled to resettable integrator RI which detects the terminal voltages $V_{1-0}$, $V_{2-0}$, and $V_{3-0}$ and integrates them over a fixed fraction of a cycle.

The integrated level of inverter output voltage is compared to a fixed first reference voltage in first level comparator LC1. The integrated level is in the form of a ramp signal $v_{c14}$ (shown in FIGS. 5f and 7) which increases in magnitude with time until it reaches the first reference voltage, at which time comparator LC1 generates a short first control pulse $\overline{HVT}$ (see FIGS. 5g and 7) which triggers a volt-second latch VSL. When volt-second latch VSL is triggered, it initiates a longer pulse VT (see FIGS. 5i and 7) which begins at pulse $\overline{HVT}$ and is terminated by the succeeding $\overline{f1}$ clock pulse. Pulse VT is fed back to integrator RI and resets it. Pulse VT is also applied to a volt-second switch VSS where it establishes the $a$ width of the chopping pulses which accomplish constant volt-second ratio when harmonic reduction is not being utilized. Power is applied to the motor beginning at the leading edge of each $a$ width PWM pulse (whose leading edge is synchronized to an $\overline{f1}$ clock pulse) and continues until the succeeding first control $\overline{HVT}$ pulse which terminates the PWM pulse. Inasmuch as the $\overline{f1}$ and $\overline{HVT}$ pulses are generated at 36 times motor frequency, the regulated flux level is one eighteenth of the motor flux level. A volt-second regulating potentiometer VOLT-SEC adjusts the terminal voltage versus frequency characteristic of the output voltages from bridge inverter INV, thereby permitting selective variation of constant torque characteristic from motor M over a speed range from a low speed up to 60 Hz or from a low speed up to 120 Hz as illustrated in FIG. 4b and described hereinafter.

The ramp signal $v_{c14}$ from integrator RI, resulting from integrating the inverter output voltage over a fixed fraction of a cycle, is compared to a constant second reference voltage in second level comparator LC2 to obtain reduction of the fifth and seventh harmonics. When the integrated voltage $v_{c14}$ reaches the second reference voltage level, comparator LC2 initiates a second control $\overline{LVT}$ pulse (shown in FIGS. 5h and 7) which is coupled to the volt-second switch VSS and establishes the width of the $b$ PWM pulses in the inverter output line-to-reference bus voltages such as $V_{1-0}$ and $V_{2-0}$. A harmonic adjustment potentiometer HARMONIC permits setting of the desired percent reduction in 5th and 7th harmonics by varying the magnitude of the second reference voltage to thereby regulate the width of the $b$ PWM pulses relative to that of the $a$ pulses.

The $f1''/6$ timing pulse train from frequency divider DIV is coupled to a sixty degree interval generator IG which also receives the unmodulated three phase reference square wave pulses A, B, and C from the three phase generator GEN. The interval generator IG derives square wave step controlling pulses H1, H2, H3 of 60° duration (shown in FIGS. 5e and 10) which respectively determine the steps on the corresponding phase-to-reference bus voltages $V_{1-0}$, $V_{2-0}$ and $V_{3-0}$ from inverter INV. These steps occur on each phase-to-reference bus waveform such as $V_{1-0}$ at an angle of 30° before and after 0° of the fundamental component and also at an angle of 30° before and after 180°. Consequently, square wave pulses H1 span 60° at the zero crossing transitions between A and Ā of the corresponding phase reference wave.

The H1, H2, and H3 step controlling pulses correspond respectively to the A, B and C reference waves which, in turn, respectively establish the fundamental output voltages from from phases 1, 2 and 3 of bridge inverter INV. The H1, H2 and H3 signals from the 60° interval generator IG are coupled to volt-second switch VSS which also receives the $\overline{\text{LVT}}$ and $\overline{\text{HVT}}$ pulses and selects the $a$ or $b$ width of PWM pulses in accordance with step controlling signals H1, H2 and H3. The output from volt-second switch VSS consists of three trains of variable width, duty cycle regulating pulses $\overline{\text{VT1}}$ (shown in FIG. 5$j$) $\overline{\text{VT2}}$, $\overline{\text{VT3}}$ which are associated respectively with phases 1, 2 and 3 of inverter bridge INV. Volt-second switch VSS provides the narrow $b$ width pulses of the $\overline{\text{VT1}}$ (see FIGS. 5k and 12) pulse train (regulated by second control pulse $\overline{\text{LVT}}$) when H1 is present and provides the wider $a$ width pulses of the $\overline{\text{VT1}}$ pulse train (regulated by the first control pulse $\overline{\text{HVT}}$) when H1 is logic 0, as described hereinafter.

Figure 4A:
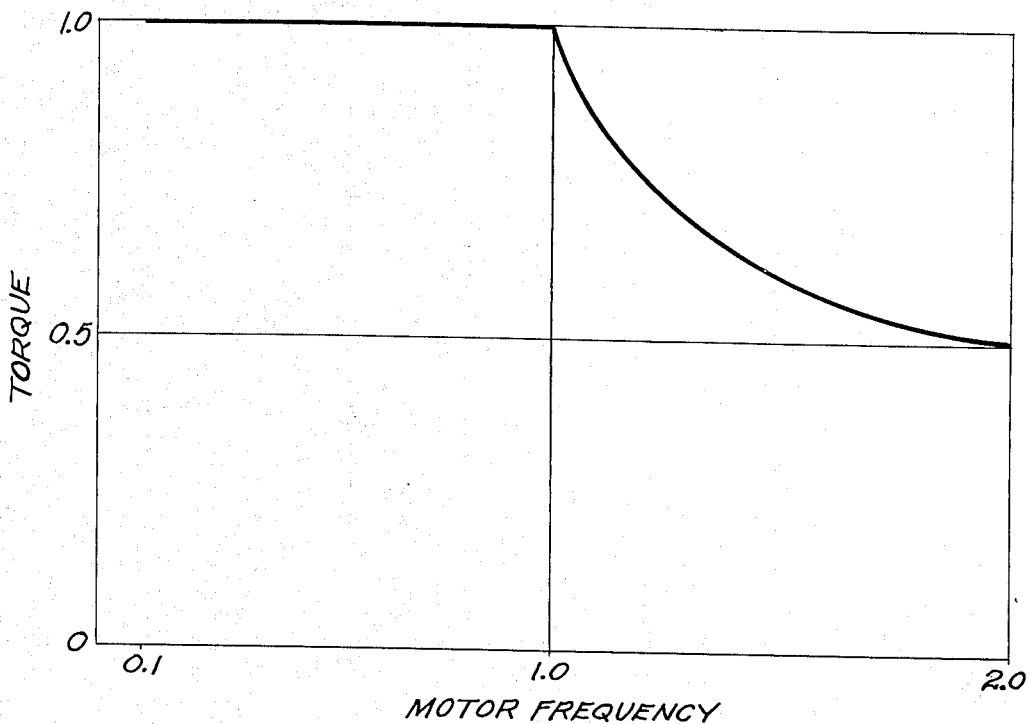
FIG. 4a shows the torque versus frequency characteristic of the motor when optimally driven by the bridge inverter of FIG. 1 for best performance and FIG. 4b shows different terminal voltage versus motor frequency characteristics with which the bridge inverter power supply shown in FIG. 1 can drive the a.c. motor so that its output torque is constant over a wide speed range.
Figure 4B:
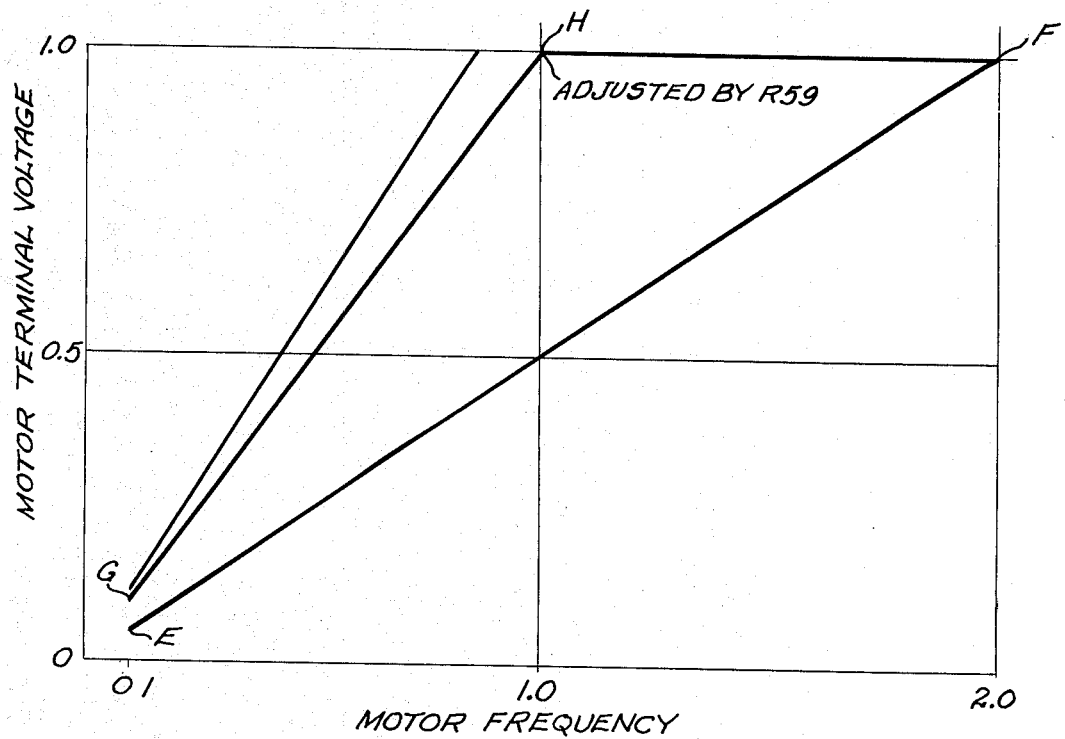

FIG. 4$a$ shows the torque-frequency characteristic of motor M when optimally driven by the variable frequency power supply of the invention to have approximately constant rated torque below motor based speed ($f$=1.0) and rated horsepower above motor base speed. The range of adjustment of motor terminal voltage versus motor frequency provided by my inverter motor drive is shown in FIG. 4$b$. A constant torque characteristic can be obtained for motor M over the entire speed range from a low speed up to twice base speed ($f$=2.0) by adjusting the VOLT-SEC potentiometer to provide the lower linear voltage-frequency characteristic EF. It will be recalled that adjustment of the VOLT-SEC potentiometer varies the interval between each $f$1 clock pulse (which initiates the PWM pulse period) and the succeeding $\overline{\text{HVT}}$ pulse and thereby regulates the width of the $a$ PWM pulses and the magnetic flux level in motor M. Alternatively, my variable frequency and variable voltage power supply can be adjusted to have the optimal torque-frequency characteristic shown in FIG. 4$a$ by setting the VOLT-SEC potentiometer so that motor terminal voltage follows the voltage-frequency characteristic GH up to motor base speed and to have the horizontal characteristic HF which provides approximately constant horsepower from base speed up to twice base speed. After the VOLT-SEC potentiometer has been adjusted to provide the desired frequency-torque characteristic for motor M, closed loop feedback from inverter output terminals $\phi_1$, $\phi_2$, $\phi_3$ to resettable integrator RI automatically maintains the correct motor terminal voltage for the set frequency. My copending application Ser. No. 558,294, filed March 14, 1975, 1975 discloses an embodiment which allows the low frequency portion of the voltage-frequency characteristic to have a voltage boost to offset the effects of relative impedance changes in motor M with variations in motor speed.

The three phase reference square waves A, B, C from the three phase generator GEN and the trains of variable width duty cycle regulating pulses $\overline{\text{VT1}}$, $\overline{\text{VT2}}$, $\overline{\text{VT3}}$ from the volt-second switch VSS are combined in a modulation logic circuit ML to form three phase patterns 1$a$, (shown in FIGS. 5$m$ and 12) 2$a$, 3$a$ which respectively control chopping of motor current by power transistors 1A, 2A, 3A and three pulse patterns 1$b$, 2$b$, 3$b$ which are the complements of 1$a$, 2$a$, 3$a$ and respectively control chopping of motor current by power transistors 1B, 2B, 3B. As described hereinafter, the "power pulses" conducted by transistors 1A and 1B of inverter phase 1 are respectively controlled by trains of transistor switching pulses 1$a$ and 1$b$ which, in turn, follow trains of duty cycle regulating pulses $\overline{\text{VT1}}$ and VT1. However, transistors 1A and 1B are also turned on to provide low voltage-drop paths for "free-wheeling" reactive current pulses during the off-time between power pulses applied to motor M.

Diagonally opposed power transistors such as 1A and 2B must be turned on in opposite legs of bridge inverter INV in order to complete a path between positive bus + and zero reference bus — through two motor windings such as W1 and W2 in series and thus apply power to motor M. If both conducting transistors are turned off, the voltage across motor windings W1 and W2 forces current to flow in a closed loop through free-wheeling diodes 1BD and 2AD in series with motor windings W1 and W2. Such conventional mode of operation would require higher PWM pulse frequencies to accomplish the same low ripple in the motor currents that is effected by my invention. Further, if both transistors are turned off when the motor current is very low in magnitude, the motor windings may not be excited sufficiently to force free-wheeling diodes 1BD and 2AD into conduction. Consequently, the motor voltage (which determines the motor flux) may float and result in oscillations of the motor.

In accordance with the invention, during a portion of the motor frequency cycle one of the two conducting transistors such as 1A and 2B in opposite legs of the bridge is forced to remain conducting while the other is turned off. Assume that 1A and 2B are conducting, and that 1A is forced to stay on while 2B is turned off. Now the voltage across the motor windings forces current to flow in a bidirectional low voltage-drop closed loop (one direction of which is shown in dashed lines in FIG. 13 through 1A and diode 2AD in series with motor windings W1 and W2). Consequently the motor current decays less than in known inverters operable in conventional manner. Further, the motor voltage is clamped close to zero volts by the conducting transistor 1A and feedback diode 1AD, thereby preventing motor oscillation and resulting in noticeable reduction in motor ripple current.

Modulation logic ML combines the reduced-harmonic pulse pattern (such as $\overline{\text{VT1}}$) corresponding to each inverter phase (such as phase one) with the corresponding reference wave (such as A) to form a train of transistor switching pulses (such as 1$a$) for switching one transistor (such as 1A) of the associated inverter phase in accordance with the complement of the reduced-harmonic pattern (such as VT1) during the reference wave positive half cycle (A) and in accordance with the reduced-harmonic pattern (such as $\overline{\text{VT1}}$) during the reference wave negative half cycle ($\overline{\text{A}}$). Modulation logic ML also derives 60°-width maximum duty cycle pulses $\overline{\text{1A}^*}$ and $\overline{\text{1B}^*}$ from the three phase reference waves A, B, C and superimposes them on the trains of transistor switching pulses so that output train 1$a$ from modulation logic ML comprises $\overline{\text{VT1}}$ during the A half cycle with a 60°-width pulse at the middle thereof (see FIGS. 5$m$ and 12) and comprises VT1 during the $\overline{\text{A}}$ half cycle with pulses deleted for 60° during the midportion thereof.

The trains of transistor switching pulses 1$a$, 1$b$, 2$a$, 2$b$, 3$a$, 3$b$ are coupled through an interface circuit INT shown only in block form to the respective associated transistors 1A, 1B, 2A, 2B, 3A, 3C which they directly control.

DESCRIPTION OF COMPONENT CIRCUITS

Voltage Controlled Oscillator

Figure 6:
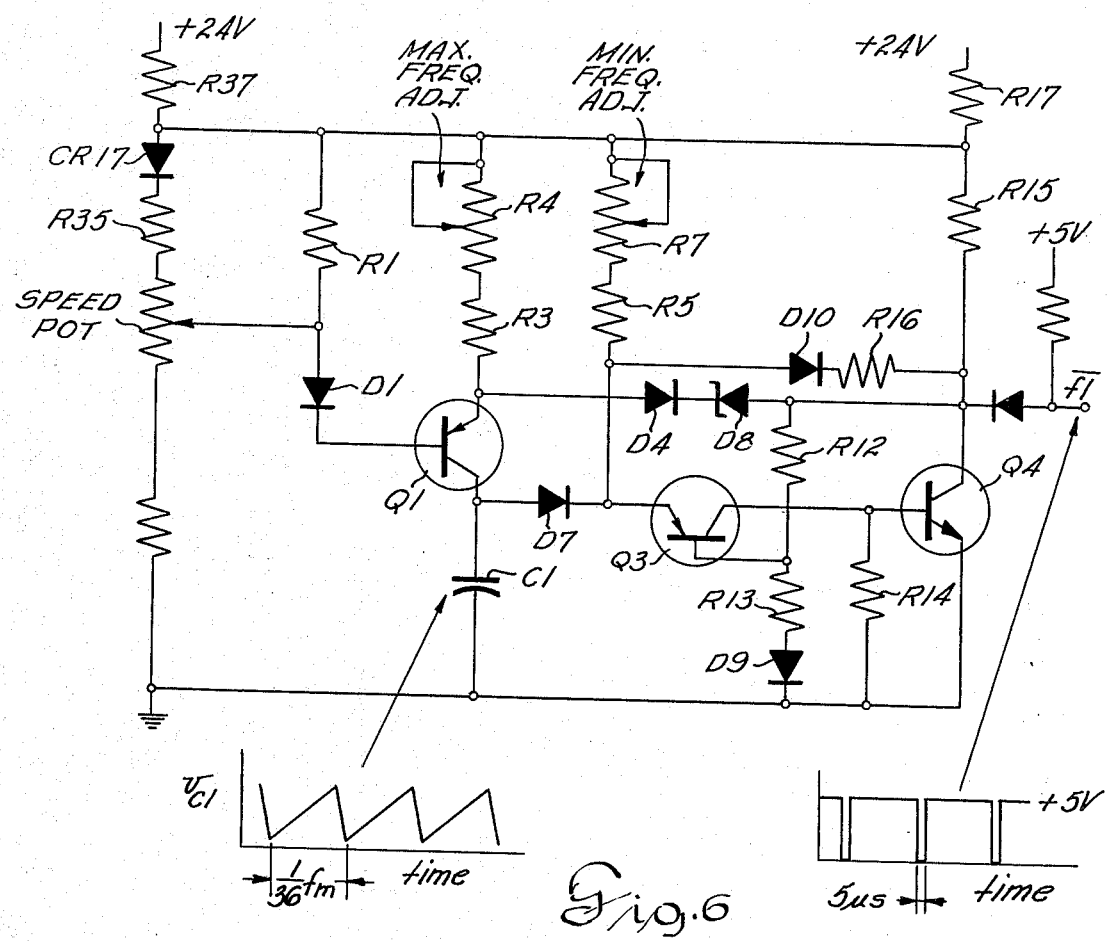
FIG. 6 illustrates the voltage controlled oscillator of the FIG. 1 motor drive and waveforms of signals generated therein.

Voltage controlled oscillator VCO shown in FIG. 6 converts the d.c. analog speed signal received from the speed potentiometer SPEED POT into a train of clock pulses $f1$ whose frequency is proportional to the magnitude of the speed signal. Oscillator VCO basically comprises a voltage controlled current source and a relaxation oscillator. The speed signal voltage is coupled to the base of a transistor Q1 which converts it into constant charging current for a timing capacitor C1 so that the charging rate of C1 is proportional to the speed signal. Three series resistors R15, R12 and R13 form a voltage divider across the +24 volt power supply. The voltage across timing capacitor C1 is coupled through a diode D7 to the emitter of a transistor Q3 whose base is referenced to the voltage divider at the junction between R12 and R13 to thereby form a differential switch. When the voltage across C1 builds up to a predetermined magnitude which forward biases transistor Q3 into conduction, the flow of collector current in Q3 through resistor R14 develops a voltage which forward biases and turns on transistor Q4. Conduction by Q4 pulls its collector approximately to ground potential to thereby generate a negative-going pulse on the $\overline{f1}$ output terminal. Conduction by Q4 also provides positive feedback by lowering the reference potential at the base of transistor Q3 to latch Q3 and Q4 in the conductive state. Capacitor C1 is rapidly discharged through diodes D7 and D10, R16, and the collector-emitter circuit Q4 to ground, and transistor Q1 is inhibited from providing charging current through conduction by diode D4 and Zener diode D8. Conduction by Q3 and Q4 lasts until capacitor C1 is discharged to a level at which Q3 becomes reverse biased and turns off, whereupon the oscillator reverts to the quiescent state. Typical waveforms are shown in FIG. 6 for the voltage $v_{c1}$ across the timing capacitor and the output clock pulse train $\overline{f1}$.

A rheostat R4 coupled between the collector of Q1 and the power supply allows adjustment of the maximum frequency of output voltage from bridge inverter INV. When the SPEED POT potentiometer is at its lower limit so that the speed signal voltage is minimum, the maximum charging current provided by Q1 for timing capacitor C1 can be adjusted at R4 to thereby set maximum inverter output frequency. When the SPEED POT is at its upper limit, the speed signal reverse biases and turns off Q1.

A minimum frequency setting rheostat R7 coupled between timing capacitor C1 and the +24 volt power supply bypasses transistor Q1 and establishes minimum charging current to C1 to thereby permit setting of the minimum frequency of output voltage from bridge inverter INV.

Volt-Second Control

Figure 7:
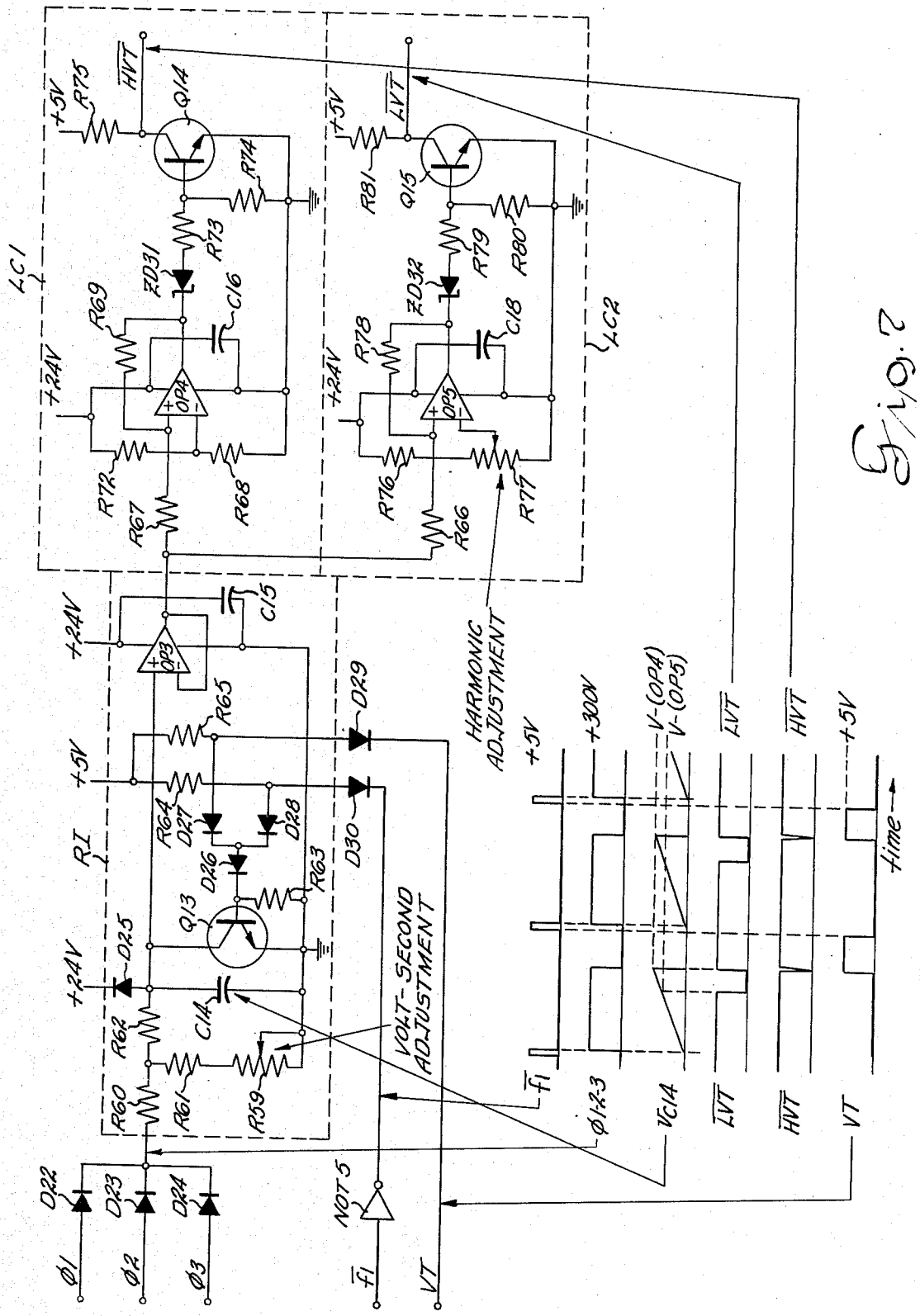
FIG. 7 shows the resettable integrator and the first and second level comparators of the FIG. 1 variable frequency power supply as well as pulses generated therein.

FIG. 7 illustrates the volt-second control circuit including resettable integrator RI which integrates the three phase output voltage of the bridge inverter INV with respect to time and also includes first and second level comparators LC1 and LC2 which compare the integrated level to first and second reference voltages respectively and derive digital first and second control pulses $\overline{HVT}$ and $\overline{LVT}$ whose phase is a function of the integrated volts/hertz level. The phase of digital pulses $\overline{HVT}$ and $\overline{LVT}$ relative to that of clock pulses $\overline{f1}$ control the $a$ and $b$ width of PWM current pulses conducted by power transistors 1A, 1B, 2A, 2B, 3A, 3B of inverter bridge INV and applied to windings W1, W2, W3 of motor M. The bridge inverter phase output voltages present at terminals $\phi_1$, $\phi_2$, $\phi_3$ are applied to an OR-circuit comprising diodes D22, D23, and D24. The OR-circuit output is applied across a voltage divider comprising the series arrangement of resistors R60 and R61 and a VOLT-SEC adjustment potentiometer R59 to ground. The voltage across the serial arrangement of R61 and R59 is applied to an integrator comprising a resistor R62 and a capacitor C14 so that a ramp voltage $v_{c14}$ (shown in FIGS. 5f and 7) builds up across capacitor C14. The slope of ramp signal $v_{c14}$ is proportional to the output voltage from bridge inverter INV and can be selectively varied by adjustment of VOLT-SEC potentiometer R59 to thereby change the fraction of the inverter output voltage appearing at terminals $\phi_1$, $\phi_2$ or $\phi_3$ applied to the integrator R62, C14.

The ramp voltage $v_{c14}$ is coupled through a follower circuit OP3 to first and second level comparators LC1 and LC2. Follower circuit OP3 is preferably an operational amplifier which acts as a buffer between the integrating circuit and the comparators.

Bridge inverter INV would apply constant volts per hertz to motor M to thereby follow a constant torque characteristic (such as EF shown in FIG. 4) if only first comparator LC1 were utilized, but second level comparator LC2 is utilized to obtain reduction of harmonics in the bridge inverter output. The ramp signal output of buffer amplifier OP3 is applied to the noninverting input of an operational amplifier OP4 of first comparator LC1 through a resistance R67. A fixed positive "first" reference voltage is applied to the inverting input of OP4 derived from a voltage divider comprising two resistors R72 and R68 connected in series between a 24 volt positive power supply and ground so that the output from OP4 is normally negative. When the magnitude of ramp signal $v_{c14}$ reaches the level of the first reference voltage, the output of operational amplifier OP4 becomes positive. The output of OP4 is coupled through a Zener diode ZD31 and a resistor R73 to the base of an NPN transistor Q14 so that Q14 is turned on when the ramp signal $v_{c14}$ reaches the threshold level. Conduction by Q14 pulls its collector to ground, or logic 0 potential to derive a negative-going $\overline{HVT}$ pulse shown in FIGS. 5g and 7. The zero level of signal $\overline{HVT}$ triggers the volt-second latch VSL (described hereinafter) which, in response thereto, generates a positive-going VT pulse (shown in FIGS. 5i and 7) which is coupled back to resettable integrator RI.

The collector-emitter circuit of an NPN transistor Q13 is connected in shunt to capacitor C14, and the base of Q13 is connected through a resistor R63 to ground so that Q13 is normally turned off. As long as signal VT is (normally) logic 0, current from a +5v power supply flows through a resistor R65 and a conductive diode D29 to the (logic 0) VT lead to thereby hold Q13 reverse biased. When signal VT becomes positive, conduction by diode D29 is blocked, and the +5 volt supply is coupled through R65 in series with diodes D27 and D26 to the base of Q13 and turns it on. Conduction by Q13 shorts capacitor C14 and terminates the zero level of control pulse $\overline{HVT}$. Signal VT remains positive and maintains Q13 turned on until the succeeding clock pulse $\overline{f1}$ resets volt-second latch VSL to terminate the VT pulse and thereby turn off Q13 and permit capacitor C14 to again begin to charge. Such operation of charging C14 and generation of pulse $\overline{\text{HVT}}$ is initiated by each $\overline{f1}$ clock pulse, and since 36 clock pulses $\overline{f1}$ occur during each full cycle of inverter fundamental output voltage such as $V_{1-0}$, the regulated flux level is one-eighteenth that of the motor flux level.

It will be appreciated that integrator RI integrates the inverter output voltage over the fixed fraction of a cycle required for the ramp voltage $v_{c14}$ to reach the first reference voltage level. As described hereinafter, PWM power pulses of $a$ width are applied to motor M whose leading edges are at an $\overline{f1}$ clock pulse and whose trailing edges are at the subsequent $\overline{\text{HVT}}$ first control pulse, thereby providing constant volts/hertz to the motor and resulting in constant flux in motor M. It will also be appreciated that adjustment of VOlT-SEC potentiometer R59 to obtain increased slope of ramp pulses $v_{c14}$ will cause the $\overline{\text{HVT}}$ pulses to occur closer to the $\overline{f1}$ clock pulses and thereby decrease the pulse width and the voltage applied to the windings of motor M. It will be recalled that adjustment of VOLT-SEC potentiometer R59 varies the slope of the constant torque voltage versus frequency characteristics for motor M shown in FIG. 4. In summary, the VOLT-SEC potentiometer R59 adjusts the motor terminal voltage versus frequency characteristics so that constant torque operation of motor M can be obtained for low speed to 60 Hz or low speed to 120 Hz.

At higher frequencies of inverter bridge output voltage, such as in the constant horsepower mode when speed of motor M is above the base speed, the constant flux level can no longer be maintained. In this constant horsepower mode, the ramp voltage $v_{c14}$ across capacitor C14 never reaches the fixed first reference voltage level in comparator LC1, and consequently first control pulse $\overline{\text{HVT}}$ is not derived. However, the succeeding $\overline{f1}$ clock pulse turns on transistor Q13 to discharge C14 at the end of every integrating period. An OR-circuit which permits pulse VT or clock pulse $\overline{f1}$ to discharge capacitor C14 includes diodes D27 and D28. The cathode of diode D28 is coupled through a diode 26 to the base of Q13, and the anode of D28 is connected to the junction of a resistor R64 and a diode D30 which are connected in series between the +5v supply and the output of a NOT gate, or inverter NOT 5 which receives the $\overline{f1}$ pulses as an input (so that its output is normally logic 0). Consequently diode D30 normally conducts so that Q13 remains reverse biased and turned off. Each negative-going clock pulse $\overline{f1}$ is converted to logic 1 by gate NOT 5 and causes diode D30 to cease conduction so that the +5v source is coupled through diodes D28 and D26 to the base of NPN transistor Q13 to forward bias Q13 into conduction, thereby discharging C14.

Second level comparator LC2 permits reduction in harmonics in the output from inverter bridge INV and is similar to comparator LC1 with the exception that the second reference voltage source is adjustable by a HARMONIC adjustment potentiometer R77 to selectively vary the percent of reduction of the fifth and seventh harmonics in the bridge inverter output voltages. A voltage divider comprising the series arrangement of a resistor R76 and harmonic adjustment potentiometer R77 is connected between the +24 volt source and ground to form the second reference voltage. The wiper of potentiometer R77 is coupled to the inverting input of a comparator operational amplifier OP5 which receives the ramp signal output $v_{c14}$ of buffer amplifier OP3 on its noninverting input. The output of amplifier OP5 is normally negative and is coupled through a Zener diode ZD32 and a resistor R79 to the base of an NPN transistor Q15 so that Q15 is normally turned off and its collector (and terminal $\overline{\text{LVT}}$ coupled thereto) are at the potential of the +5 volt source. When the ramp signal $v_{c14}$ from amplifier OP3 reaches the level of the second reference voltage, the output of amplifier OP5 switches positive to turn on transistor Q15. Conduction by Q15 pulls its collector approximately to ground potential to derive the negative-going leading edge of an $\overline{\text{LVT}}$ pulse. Harmonic adjustment potentiometer R77 is preferably set to a second reference voltage 0.732 times the first reference voltage applied to first level comparator amplifier OP4 to thereby obtain maximum harmonic reduction.

As described hereinafter, PWM current pulses are applied by bridge inverter INV to motor M whose leading edges coincide with the clock pulses $\overline{f1}$. When potentiometer R77 is set for maximum harmonic reduction, the PWM pulses which occur during the first 30° and during the last 30° of the positive half cycle of each inverter line-to-reference bus voltage $V_{1-0}$, $V_{2-0}$ and $V_{3-0}$ are terminated at the $\overline{\text{LVT}}$ pulses, thereby providing the $b$ width PWM pulses from transistors 1A through 3B which result in the steps in the line-to-reference bus voltages shown in FIG. 2b that accomplish the desired reduction in harmonics.

Divide-by-Six Counter

FIG. 8 shows the divide-by-six counter DIV which receives the $\overline{f1}$ clock pulses and provides an output of two trains of timing pulses $f1'/6$ and $f1''/6$ (see FIGS. 5b and 5c) that are displaced in phase 180° and whose frequency is 1/6 that of the $\overline{f1}$ clock pulses. A commercially available 7492 MSI logic circuit is the principal logic element and consists internally of a divide-by-three and two divide-by-two counters (not shown). The $\overline{f1}$ clock pulse train is converted to positive-going $f1$ pulses by an inverter, or NOT gate NOT 7 which are applied to the input to the divide-by-three counter, and the resulting $f1/3$ output is routed internally of the logic package through a divide-by-two counter to form $f1/6$ pulses. The $f1$ pulses, the $f1/3$ pulses and the $f1/6$ pulses are inputs to a NAND logic gate 35b, and a $f1'/6$ output pulse is generated when the three inputs are logic 1 simultaneously. The f1 pulses and the $f1/3$ pulses are inputs to a NAND gate 35a which also receives the inverse of the $f1/6$ pulses through a NOT gate 27a, and a $f1''/6$ pulse is generated from NAND gate 35a by the simultaneous occurrence of logic 1 signals on $f1/3$ and $f1$ and a logic 0 signal on $f1/6$. FIG. 8 illustrates the $f1$, $f1/3$, and $f1/6$ pulses as well as the 180° displaced $f1'/6$ and $f1''/6$ pulse trains.

Three Phase Generator

Figure 9:
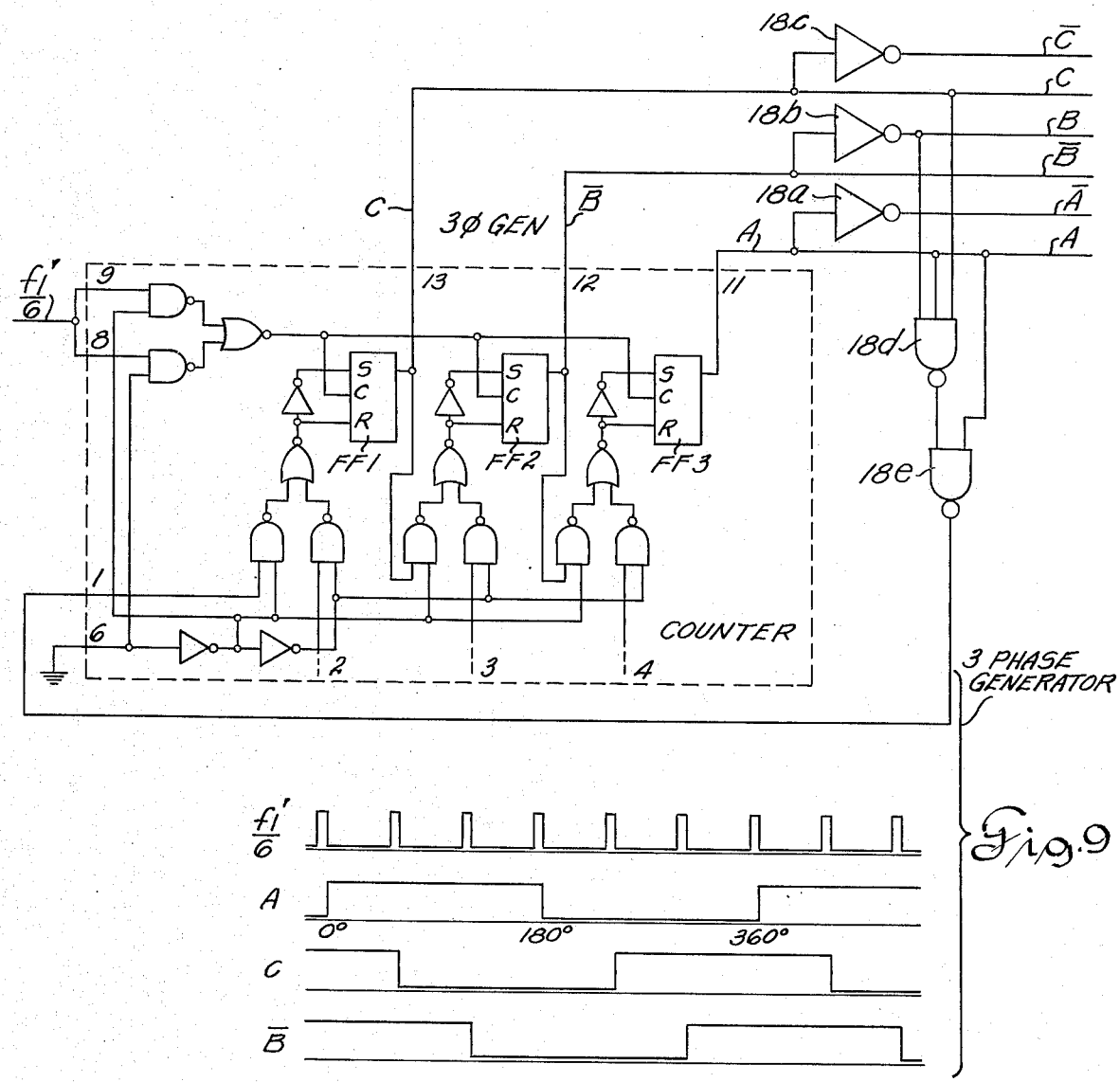
FIG. 9 shows the three phase generator of the FIG. 1 motor drive and the three phase reference square waves generated thereby.

The three phase generator GEN shown in FIG. 9 receives the $f1'/6$ train of timing pulses from the divide-by-six counter DIV and provides an output of three phase square reference waves A, B, C, shown in FIG. 3d and their complements $\overline{A}, \overline{B}, \overline{C}$. GEN may comprise a three-bit shift register of three master-slave set-reset type flip-flops FF1, FF2, and FF3 and is shown as being constructed from a commercially available four-bit shift register Medium Scale Integration (MSI) 7495 logic package. The $f1'/6$ timing pulses are fed to the clock inputs (c) of all three flip-flops FF1, FF2, and FF3 which respectively provide reference waves C, $\overline{B}$, A on their outputs and are arranged in a ring through an external NAND gate 18d which receives reference wave A, B, C as inputs and an external NAND gate 18e which receives the output of 18d and reference wave A as inputs. A change of state of one of the three flip-flops FF1, FF2, or FF3 occurs at the trailing edge of each $f1'/6$ pulse to thereby generate an edge of one of the shift register output square waves A, $\overline{B}$, or C and to prepare the succeeding "slave" flip-flop for the succeeding $f1'/6$ pulse. The generated output A, $\overline{B}$, C requires one inverter gate 18B to provide the usual set of three phase reference waves A, B, C and three inverter gates 18a, 18b, 18c to provide six reference waves A, $\overline{A}$, B, $\overline{B}$, C, $\overline{C}$. When A goes to logic 1, all three inputs to 18d are logic 1 and it provides logic 0 output to 18e which goes to logic 1 to prepare FF1 for the succeeding timing pulse $f1'/6$.

60° Interval Generator

The unmodulated three phase square waves A, B, C, $\overline{A}$, $\overline{B}$, $\overline{C}$ from GEN are coupled to the 60° interval circuit IG, and the timing pulse train $f1''/6$ is also applied to the 60° interval circuit IG to determine the portions of the three phase reference square waves A, B, C during which the power transistors 1A through 3B provide PWM pulses of narrower $b$ width to thereby provide the steps in the inverter output voltages with resultant reduction of fifth and seventh harmonics. A portion of the 60° interval circuit IG for phase one and the voltage input and output waveforms are shown in FIG. 10.

The steps in the line-to-reference bus output voltages from each phase leg of the bridge inverter such as $V_{1-0}$ and $V_{2-0}$ occur at an angle of 30° before and 30° after the positive-going zero crossing of the corresponding phase reference wave (e.g., in $V_{1-0}$ before and after 0° of the A reference wave) and also at an angle of 30° before and 30° after the negative-going zero crossing of the corresponding phase reference wave (i.e., in $V_{1-0}$ before and after 180° of the A reference wave). The interval generator IG derives H1 square waves of 60° duration for phase one which span the positive-going zero crossings and also span the negative-going zero crossings of the A reference wave and determine when transistors 1A and 1B provide $b$ width PWM power pulses to the motor winding, thereby reducing the fifth and seventh harmonics in the current supplied to motor M. The interval generator IG also derives similar square waves H2 and H3 of 60° duration for phase 2 and phase 3.

Phase one of the 60° interval circuit IG includes four three-input NAND gates 19A–19D each of which receives the train of $f1''/6$ timing pulses and also includes two NAND gates 36A and 36B whose outputs are cross-connected for form a latch. Each NAND gate 19A–19D receives two of the reference square wave inputs as follows:

| | | REFERENCE WAVE INPUTS | | | | |
|---|---|---|---|---|---|---|
| | | A | $\overline{A}$ | B | $\overline{B}$ | C | $\overline{C}$ |
| G | 19A | X | | X | | | |
| A | 19B | | X | | X | | |
| T | 19C | X | | | | X | |
| E | 19D | | X | | | | X |

The outputs of 19A and 19B are commoned in order to combine the $f1''/6$ timing pulses with the reference waves and thereby form signal $\overline{SH1}$ which is an input to gate 36A and sets the latch, and the outputs of 19C and 19D are similarly commoned in order to form signal $\overline{RH1}$ which is applied to an input of 36B and resets the latch. The latch 36A–36B is set when signal $\overline{SH1}$ becomes logic 0 to establish the leading edge of the H1 pulse and is reset when signal $\overline{RH1}$ becomes logic 0 to establish the trailing edge of H1. It should be recalled that the edges of the reference waves A, B, C, $\overline{A}$, $\overline{B}$, $\overline{C}$ are 60° apart and are generated by $f1'/6$ timing pulses and that the $f1''/6$ timing pulses (which are combined with A, B, C to derive $\overline{SH1}$ and $\overline{RH1}$) are 180° displaced from and occur between $f1''/6$ pulses. Consequently, $\overline{SH1}$ and $\overline{RH1}$ are at 30° angles with respect to the transitions between A and $\overline{A}$. During the intervals between $f1''/6$ pulses the $\overline{RH1}$ and $\overline{SH1}$ outputs of the NAND gates 19A–19D are logic 1 and do not affect the latch.

When a $f1''/6$ timing pulse (such as $u$ shown in FIG. 10) occurs 30° prior to the leading positive-going edge of reference wave A and signals $\overline{A}$ and $\overline{B}$ are both logic 1, all three inputs to 19B are logic 1 and its output on lead $\overline{SH1}$ is logic 0 to set the latch and derive the leading edge of the H1 pulse which spans the positive-going transition of the A reference wave. When the succeeding $f1''/6$ timing pulse $v$ occurs 60° later and both reference waves A and C are logic 1, all three inputs to 19C are logic 1 and it provides logic 0 on the $\overline{RH1}$ lead to reset the latch and derive the trailing edge of the H1 pulse. When a $f1''/6$ timing pulse $x$ occurs 30° prior to the negative-going edge of the A reference wave (i.e., 30° prior to 180°) and both reference waves A and B are logic 1, all three inputs to gate 19A are logic 1 and it provides logic 0 on the $\overline{SH1}$ lead to set the latch and thus derive the leading edge of a H1 pulse. When the succeeding $f1''/6$ timing pulse $Y$ occurs 60° later and reference waves A and C are logic 1, all three inputs to 19D are logic 1 and its output becomes logic 0 on the $\overline{RH1}$ lead to reset the latch and thus derive the trailing edge of the H1 pulse. Similar circuits generate the H2 and H3 pulses of 60° duration for phases 2 and 3 of the bridge inverter.

Volt-Second Switch

The volt-second switch VSS (see FIG. 11) receives the 60° square wave step controlling pulses H1, H2 and H3 from the 60° interval circuit IG and, in response thereto, selects whether the $\overline{HVT}$ or the $\overline{LVT}$ signal controls the position of the trailing edge of the PWM current pulses provided by transistors 1A through 3B to the motor M. Volt-second switch VSS generates three harmonic-reduced pulse patterns VT1, VT2, VT3 which (after modification in modulation logic ML) control the switching of the transistors 1A-1B, 2A-2B, 3A-3B respectively in the three legs of bridge inverter INV to thereby provide both constant torque operation of motor M and reduced harmonics in the motor currents. Stated in another manner, volt-second switch VSS controls whether the PWM pulses in the inverter line-to-reference bus voltages $V_{1-0}$, $V_{2-0}$ and $V_{3-0}$ are of $a$ width or of $b$ width as a function the absence of presence of the H1, H2 and H3 step controlling pulses. If H1 is logic 1, transistors 1A and 1B are turned off at the $\overline{LVT}$ pulses to thereby provide $b$ width PWM pulses, whereas if H1 is logic 0 transistors 1A and 1B are turned off at the $\overline{HVT}$ pulses to thereby provide $a$ width PWM pulses.

Figure 11:
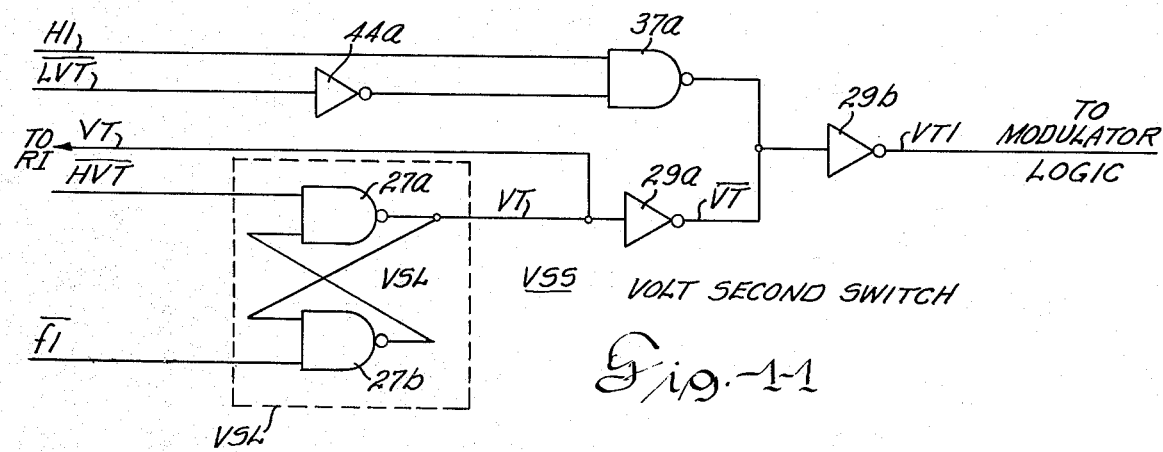
FIG. 11 shows the volt-second latch and the portion of the volt-second switch of the FIG. 1 motor drive for phase one of the bridge inverter.

FIG. 11 only illustrates the portion of volt-second switch VSS which produces the VT1 harmonic-reduced pulse pattern that controls the switching of transistor 1A and 1B of phase leg one of the bridge inverter INV to simultaneously accomplish volt-second control and harmonic reduction. Volt-second switch VSS includes the volt-second latch VSL comprising cross-connected NAND gates 27a and 27b which latch is triggered by each $\overline{HVT}$ pulse from first level comparator LC1 to initiate the VT pulse which is fed back to reset integrator RI by discharging capacitor C14. The output of NAND gate 27a, which receives the $\overline{HVT}$ first control pulses as an input, is coupled to an input of NAND gate 27b which receives the $\overline{f1}$ clock pulses as an input, and similarly the output of 27b is connected to an input of 27a. Each $\overline{HVT}$ pulse from first comparator LC1 sets latch VSL to generate the positive-going leading edge of the VT pulse at the output of gate 27a which is fed back to resettable integrator RI to discharge capacitor C14 and terminate the ramp signal $v_c$. The subsequent $\overline{f1}$ clock pulse resets the latch 27a, 27b to terminate the VT pulse (by providing logic 0 from gate 27A) which turns off transistor Q13 and thus permits capacitor C14 of integrator RI to begin charging. The signal VT thus begins at pulse $\overline{HVT}$ from first comparator LC1 and terminates at the subsequent clock pulse $\overline{f1}$.

H1 Pulse Absent

The pulses VT provided at the output of gate 27a of the latch VSL are inverted by NOT gate, or inverter 29a whose output is coupled through an OR-circuit comprising an inverter 29b to the VT1 lead. When the square wave H1 is absent, i.e., logic 0, the pulses of the VT1 train are identical to the VT pulses. (See FIGS. 5n and 5j.) As described hereinafter, during the positive half cycle of the A reference wave when A = logic 1 and $\overline{A}$ = logic 0 and H1 = logic 0, transistor 1A follows the complement of VT1, i.e., the $\overline{VT1}$ train. Stated another way, the pulses of the 1a train from modulation logic ML which control switching of transistor 1A are of width (w-VT), where w is the PWM pulse period, and such (w-VT) pulses are the $a$ width pulses discussed hereinafter. Transistor 1B follows the 1b pulse train from modulation logic ML which is the complement of 1a and identical to VT1. In repetition, the period w of the PWM pulses is the interval between $\overline{f1}$ clock pulses. When H1 is logic 0, each $\overline{f1}$ pulse resets latch 27a, 27b to provide logic 0 output from 27a on the VT lead, logic 1 from 29a, logic 0 from OR-circuit 29b on the VT1 lead, and logic 1 on the $\overline{VT1}$ lead in modulation logic circuit ML to thereby turn on transistor 1A and initiate an $a$ width PWM pulse. When the ramp voltage $v_{c14}$ reaches the level of the first reference voltage, comparator LC1 generates a $\overline{HVT}$ pulse which sets latch 27a, 27b to thereby provide logic 1 output from 27a on the VT lead and logic 0 on the $\overline{VT1}$ lead to terminate the $a$ width pulse conducted by transistor 1A. The transistor 1A remains nonconductive until the succeeding $\overline{f1}$ clock pulse resets latch 27a, 27b to provide logic 0 on the VT lead and logic 1 on the $\overline{VT1}$ lead to thereby initiate the succeeding $a$ width pulse by transistor 1A.

H1 Pulse Present

The H1 pulses are coupled to the input of a NAND gate 37a which also receives the $\overline{LVT}$ pulses from comparator LC2 after they are inverted by a NOT gate 44a, i.e., it is second input receives the positive-going LVT pulses. As long as H1 is logic 0, i.e., absent, the output of 37a is logic 1 and is coupled to the input of OR-circuit 29b which also receives the $\overline{VT}$ signal from 29a so that OR-circuit 29b provides the VT pulse on the VT1 lead. The output of 29a goes to logic 0 and pulls the input of 29b to logic 0 when VT goes to logic 1, and consequently the output of inverter OR-circuit 29b goes to logic 1 on the VT1 lead and follows the pattern of VT pulses as long as H1 is absent.

When the 60° square wave H1 is logic 1, the output of 37a goes to logic 0 when an LVT pulse is present so that the input to OR-circuit inverter 29b from 37a is the negative-going $\overline{LVT}$ pulse train. (See FIG. 5h.) It will be recalled that signal $\overline{LVT}$ goes to logic 0 in second comparator LC2 when ramp signal $v_{c14}$ reaches the level of the second reference voltage and also that signal $\overline{LVT}$ remains logic 0 until the succeeding $\overline{HVT}$ pulse. The output of OR-circuit inverter 29b on the VT1 lead is held at logic 1 by the logic 0 output of 37a for the duration of the $\overline{LVT}$ pulse (which terminates at the $\overline{HVT}$ pulse) and is held at logic 1 by the logic 0 output $\overline{VT}$ of 29a for the remainder of the PWM pulse period, i.e., from the $\overline{HVT}$ pulse until the succeeding $\overline{f1}$ clock pulse. The positive-going pulses of the VT1 train are thus of a width (w-b) as long as 60° pulse H1 is logic 1 and are initiated at each $\overline{LVT}$ pulse and terminated at the succeeding $\overline{f1}$ clock pulse. Inasmuch as transistor 1A follows the complement of VT1 pulses, i.e. $\overline{VT1}$, during the 180° positive half cycle of the A reference wave, the pulses of the 1a train from modulation logic ML which control switching of 1A are of b width during the first 30° and during the last 30° of the A wave positive half cycle since H1 spans the transitions between the A and $\overline{A}$ reference waves. The pulses of the 1b train which control switching of transistor 1B are the complement of 1a and are identical to the VT1 pulses and of width (w-b) during the first 30° and during the last 30° of the A reference wave positive half cycle.

Modulation Logic

The three phase reference waves A, B, C from the three phase generator GEN are combined in the modulation logic ML with the harmonic-reduced pulse patterns VT1, VT2, VT3 from volt-second switch VSS to form three waveforms 1a, 2a, 3a for switching transistors 1A, 2A, 3A of the inverter bridge respectively on and off and also to form the complements 1b, 2b, 3b for switching transistors 1B, 2B, 3B on and off. FIG. 12 shows the portion of modulation logic ML for phase 1 of the inverter bridge INV. The pulse patterns 1a and 1b for turning transistors 1A and 2B on and off to apply power to motor M are controlled by pulse train $\overline{VT1}$. However, power transistors such as 1A and 1B must also conduct to provide current paths for free-wheeling reactive current pulses in the intervals between "power" pulses. It will be recalled that power is only applied to motor M when a path is completed from the + bus through two motor phase windings such as W1 and W2 in series to the − bus, and completion of such path requires simultaneous conduction by diagonally opposite transistors such as 1A and 2B in two legs of inverter bridge INV. If both diagonally opposed conducting transistors such as 1A and 2B were turned off in conventional manner, current would be forced to flow through feedback diode 1BD, motor windings W1 and W2 in series, feedback diode 2AD and the DC power source BR by the voltage across the highly inductive motor M. The motor windings would thus see a voltage equal in magnitude but opposite in polarity to the d.c. source BR in the off-time interval that 1A and 2B are both off, and consequently motor current would decay relatively rapidly and higher PWM pulse frequencies would be required to maintain low-ripple motor currents. Further, if both transistors such as 1A and 2B are turned off near the point where the motor current is crossing the zero axis, the motor may not be excited sufficiently to force diode 1BD and 2AD into conduction, and consequently, the motor voltage may float. Since motor voltage determines the magnitude of magnetic flux in the high impedance motor circuit, the motor may tend to oscillate.

In accordance with the invention, one of the two diagonally opposed conducting transistors 1A or 2B is forced to remain conducting while the other is turned off. Assume that 2B is turned off and that 1A is forced to remain conducting. Now "free-wheeling" current is caused to flow during the off-time through motor windings W1 and W2 in a bidirectional low voltage-drop loop (one direction of which is shown in dashed lines in FIG. 13 through transistor 1A and diode 2AD) which loop does not include the d.c. source, thereby limiting the reverse polarity motor voltage to a very low value. Consequently, motor current is maintained relatively constant during the "off" period of the PWM pulses. The conducting transistor such as 1A together with feedback diode 1AD provide a low impedance bidirectional path between the motor windings and one side of the d.c. source which minimizes the requirement for high frequencies in the PWM modulation and provides a substantial reduction in motor current ripple and prevents oscillations in motor torque. It should be noted that the paths for free-wheeling pulses are bidirectional and also permit reactive current flow in the opposite direction such as shown in dot-dash lines in FIG. 13 through transistor 2A and feedback diode 1AD.

The phase one portion of modulation logic ML shown in FIG. 12 derives signals 1A* and 1B* from the three phase reference square waves A, B, C, $\overline{A}$, $\overline{B}$, $\overline{C}$ and combines such signals 1A* and 1B* with pulse pattern $\overline{VT1}$ to form pulse trains 1a and 1b for respectively controlling power transistor 1A and 1B of phase one. Such pulse patterns 1a and 1b control application of power to motor M and also force individual transistors to remain conducting to thereby apply "freewheeling" pulses to motor M. Stated another way, the 1A* and 1B* signals derived by modulation logic ML provide some of the "power" pulses in the 1a and 1b patterns which apply power to motor M and some of the "free-wheeling" pulses which force one of the diagonally opposed transistors to remain conducting during the off period of the PWM pulses.

Modulation logic ML includes a three-input NAND gate 32A which receives the A, $\overline{B}$ and C reference waves and provides a logic 0 output on lead 1A* during the 60° of each motor fundamental frequency cycle wherein A, $\overline{B}$ and $\overline{C}$ are logic 1, and this occurs during the middle 60° of the 180° reference wave A positive half cycle, i.e., when A = logic 1 and $\overline{A}$ = 0. A NAND gate 23a receives the $\overline{VT}1$ pulse pattern and the 1A* output signal from gate 32a as inputs and superimposes the 1A* signal on the VT1 pattern. A NAND gate 23b receives the A reference wave and the output of 23a as inputs and during the A reference wave positive half cycle (when A = 1 and $\overline{A}$ = 0) has as an output the $\overline{VT1}$ pulse train with 1A* superimposed thereon. The output of gate 23b is coupled to an input of a NAND gate 22a whose output is the 1a train of transistor-switching pulses which directly controls switching of transistor 1A.

The three reference square waves $\overline{A}$, B, and C are inputs to a NAND gate 32b which provides a logic 0 output on the 1B* lead during the middle 60° portion of the 180° $\overline{A}$ reference wave when $\overline{A}$, B and C are all logic 1. The 1B* signal, the A reference wave, and the $\overline{VT1}$ pulse train are inputs to a NAND gate 30a whose output is applied to an input of gate 22a. The output of gate 22a is the 1a train of pulses which control switching of transistor 1A and is also coupled to the 1b lead through an inverter gate NOT 11 whose output is the 1b train of pulses which controls switching of transistor 1B. The pulse trains which directly control transistors 1A and 1B may be represented by the following Boolean algebra equations:

$$1a = (A)(1A^* + \overline{VT1}) + (\overline{A})(\overline{1B^* + VT1})$$

$$1b = (\overline{A})(1B^* + \overline{VT1}) + (A)(\overline{1A^* + VT1})$$

$$1a = \overline{1b}$$

During the 180° of the inverter output fundamental frequency cycle when reference wave A = logic 1, pulse train 1a (which controls 1A) follows the $\overline{VT1}$ pulse train with 1A* superimposed during the middle 60° thereof. The 1a pulse train applies "power" pulses to motor M and is represented by the (A)(1A* + $\overline{VT1}$) portion of the above Boolean algebra equation. Transistor 1B is simultaneously controlled by the VT1 pulse pattern with 1B* deleted from the pattern, i.e., it follows pulse pattern 1b which is the complement of that applied to transistor 1A. It will be noted from FIGS. 5m and 12 that the 1a pulse pattern includes b width pulses during the first 30° and during the last 30° of the 180° duration A reference wave positive half cycle and also includes a maximum duty cycle 60° pulse (controlled by 1A*) during the midportion thereof. It will be appreciated that transistor 1B conducts during the off-time, or blank periods between the positive-going pulses of the 1a pattern. It will also be recalled that the motor windings, such as W1 and W2 in series, see the line-to-line voltage such as $V_{1-2}$ which is the resultant of combining the phase one and phase two line-to-reference bus voltages $V_{1-0}$ and $V_{2-0}$. As shown in FIG. 3, during the first 60° of the 180° positive half cycle of the A reference wave, no pulses occur in the $V_{2-0}$ line-to-reference bus voltage. Pulses of b width occur in the first 30° of the $V_{1-2}$ line-to-line wave as a result of b width pulses in $V_{1-0}$. The b width pulses in $V_{1-0}$ are PWM pulses conducted by 1A (which is controlled by train 1a that follows $\overline{VT1}$) while 2B controlled by train 2b is conducting a 60° width pulse and results in a step of 0.732 times the peak average voltage $E_{AV}$ in both $V_{1-0}$ and $V_{1-2}$ (where $E_{AV}$ equals $a/w$ times E). The following table shows the width of PWM pulses conducted by transistors 1A, 1B, 2A, 2B and the resulting pulses in $V_{1-0}$, $V_{2-0}$ and $V_{1-2}$ during each 30° period of the 360° duration phase A reference wave.

| | Portion | WIDTH OF PULSES | | | | | | | |
|---|---|---|---|---|---|---|---|---|---|
| | | 1A | 1B | $V_{1-0}$ | 2A | 2B | $V_{2-0}$ | $V_{1-2}$ | $V_{1-2}$ (% of $E_{AV}$) |
| A | 0°–30° | b | w-b | b | 0 | Cont. | 0 | b | +73.2 |
| | 30°–60° | a | w-a | a | 0 | Cont. | 0 | a | 100 |
| | 60°–90° | Cont. | 0 | Cont. | w-a | a | w-a | a | 100 |
| | 90°–120° | Cont. | 0 | Cont. | w-b | b | w-b | b | +73.2 |
| | 120°14 150° | a | w-a | a | b | w-b | b | a-b | +26.8 |
| | 150°–180° | b | w-b | b | a | w-a | a | a-b | −26.8 |
| $\overline{A}$ | 180°–210° | w-b | b | w-b | Cont. | 0 | Cont. | b | −73.2 |
| | 210°–240° | w-a | a | w-a | Cont. | 0 | Cont. | a | −100 |
| | 240°–270° | 0 | Cont. | 0 | a | w-a | a | a | −100 |
| | 270°–300° | 0 | Cont. | 0 | b | w-b | b | b | −73.2 |
| | 300°–330° | w-a | a | w-a | w-b | b | w-b | a-b | −26.8 |
| | 330°–360° | w-b | b | w-b | w-a | a | w-a | a-b | +26.8 |

Cont. signifies Continuous

During the 30°–60° period of the positive half cycle of the phase A reference wave, a width pulses occur in $V_{1-2}$ as a result of a width pulses in $V_{1-0}$ due to conduction of a width PWM pulses by 1A which is controlled by train 1a that follows train pulse pattern $\overline{VT1}$. During this 30°–60° period 2B is controlled by the 60° width pulse of train 2b and is conducting continuously. During the middle 60° of the positive half cycle of the phase A reference wave when the 1a pulse train includes the maximum duty, or continuous pulse, transistor 2A is following the 120°–180° portion of the VT2 pulse train so that 2A conducts power pulses of (w-a) width in the 60°–90° portion of the A wave and power pulses of (w-b) width in the 90°–120° portion of the A wave. When 2A is off and 2B is on during the 60°–90° portion of the A reference wave, a power pulse of a width appears in the line-to-line voltage $V_{1-2}$ as a result of simultaneous conduction by 1A and 2B. When 2A is on and 2B is off during this portion, the 60° pulse in the 1a train forces 1A to remain conducting so that a free-wheeling pulse of current having a width (w-a) flows in the bidirectional low voltage-drop path shown in FIG. 13, i.e., in one direction through conducting transistor 1A, motor windings W1 and W2, and feedback diode 2A shown in dashed lines and in the opposite direction through transistor 2A, W2 and W1, and diode 1AD shown in dot-dash lines.

During the 120°–150° portion of the positive half cycle of the A reference wave, transistor 1A is conducting while transistor 2A is being turned on by b width pulses. Consequently, resultant power pulses of (a-b) width exist in line-to-line voltages $V_{1-2}$ and provide a step in $V_{1-2}$ of 0.268 times the peak average voltage $E_{AV}$ (where $E_{AV} = a/w$ times source voltage E).

During the 150°–180° portion of the A reference wave, 1A is being turned on by b width pulses in the 1a pattern and 2A is being turned on by a width pulses in the 2a pattern. Consequently resultant "negative" power pulses of (a-b) width appear in line-to-line voltage $V_{1-2}$ and provide a step of 0.268 times the peak voltage $E_{AV}$ for 30° proceeding the negative-going zero crossing transistion from the positive half cycle A to the $\overline{A}$, or negative half cycle of the A reference wave.

During the 180° duration of the negative half cycle of the A reference wave (i.e., during $\overline{A}$), transistor 1A follows pulse pattern 1a awhich comprises the VT1 pulse train with 1B* deleted from the pattern. The 1a pattern during the $\overline{A}$, or negative half cycle provides free-wheeling PWM pulses by forcing 1A to remain on while diagonally opposed transistor 2B (or 3B) is turned off and during which no power is applied to the motor. Such free-wheeling pulses are represented by the $(\overline{A})(\overline{1B^* + VT1})$ portion of the Boolean algebra equation for 1a. It will be recalled that forcing 1A to remain conducting while 2B is turned off causes reactive load current to flow in the bidirectional low-voltage drop loop shown in FIG. 13 (e.g., through 1A, windings W1 and W2 in series, and feedback diode 2AD) to thereby clamp the motor voltage to one side of the d.c. source. This prevents torque oscillations of motor M and also minimizes high magnitude of ripple that otherwise might occur in the motor currents.

During the first 30° of the A reference wave negative half cycle, transistor 1A is controlled by pulses of (w-b) width in the 1A train, transistor 1B is being turned on by b width pulses in the 1b train, and transistor 2A is controlled by the 60° width, maximum duty cycle pulses in the 2a train so that the resultant line-to-line voltage $V_{1-2}$ has "negative" b width pulses which flow through simultaneously conducting transistors 2A and 1B and provide a step in $V_{1-2}$ whose value is 0.732 times the peak average voltages $E_{AV}$. The 60° continuous pulse in the 2a pattern forces 2A to remain on while 1B is turned off and thus causes free-wheeling pulses of (a-b) width to flow in the bidirectional low voltage-drop loop shown in FIG. 13 (e.g., in one direction through 2A, motor windings W2 and W1, and 1AD).

One advantage of the 60° maximum duty cycle, or continuous pulses in the pulse trains such as 1a and 1b provided by the 1A* and 1B* signals is that while 36 PWM pulse periods exist in each full cycle of reference current (i.e., during 360°, the transistors such as 1A and 1B only switch 23 times during each full cycle of motor fundamental frequency voltage. The invention thus results in a reduction in chopping frequency and minimizes the number of transistor switching operations during the portions of the fundamental voltage cycle when motor currents may be of peak magnitude during machine loading.

Modulation logic ML generates trains of pulses 2a, 2b and 3a, 3b (not shown) in a similar manner which respectively control switching of the transistors 2A, 2B and 3A, 3B in the phase 2 and phase 3 legs of bridge inverter INV. The trains of pulses 1a, 1b, 2a, 2b, 3a, 3b are applied to the corresponding transistors 1A, 1B, 2A, 2B, 3A and 3B respectively through an interface circuit INT which is shown only in block form and does not constitute part of the present invention.

While only a single embodiment of my invention has been illustrated and described, many modifications and variations thereof will be readily apparent to those skilled in the art, and consequently it should be understood that I do not intend to be limited to the particular embodiment shown and described.

The embodiments of the invention in which an exclusive property or privilege is claimed are defined as follows:

1. A harmonic-reduced variable frequency and variable voltage power supply for a three phase a.c. motor (M) comprising, in combination, a d.c. source (BR), a three phase inverter bridge (INV) including a plurality of power transistors (1A, 1B, 1C, 2A, 2B, 2C) between said d.c. source and said motor, means (SPEED POT) for deriving an analog speed signal indicative of desired speed of said motor, oscillator means (VCO) for providing a train of clock pulses (f1) whose frequency is a function of the magnitude of said analog speed signal, resettable volt/hertz integrator means (RI) receiving as an input the output voltage from said inverter bridge for integrating said output voltage with respect to time and for deriving a train of ramp pulses ($v_{c14}$) which are synchronized to said clock pulses and whose instantaneous magnitude varies with time as a function of the volt/hertz integral, a first comparator (LC1) for comparing said volt/hertz integral to a first reference voltage and for deriving a first control pulse ($\overline{HVT}$) when the voltage of each said ramp pulse becomes equal to said first reference voltage, a second comparator (LC2) for comparing said volt/hertz integral to a second reference voltage which is of lower magnitude than said first reference voltage and for deriving a second control pulse ($\overline{LVT}$) when the voltage of each said ramp pulse becomes equal to said second reference voltage, OR-circuit means (D27, D28, Q13) for disabling said integrator means when said first control pulse ($\overline{HVT}$) is generated and for holding said integrator means disabled until the succeeding clock pulse (f1) is generated or for disabling said integrator means when the succeeding clock pulse is generated, a three phase generator (GEN) for deriving three phase reference waves (A, B, C) displaced 120 electrical degrees apart having a 360 electrical degree period equal to the time interval required to generate a predetermined number of said clock pulses with positive and negative half cycles, each of said reference waves being associated with one phase of said bridge, modulation means for controlling the fundamental output voltages of individual phases of said three phase inverter bridge in accordance with said three phase reference waves (A, B, C) and including means for pulse width modulating the output power of said individual phases of said bridge by variable width PWM pulses whose leading edges are established by said clock pulses, said pulse width modulation means regulating the termination of PWM pulses which occur during the first 30 degrees and during the last 30 degrees of the positive half cycles of the associated reference waves as a function of said second control pulses ($\overline{LVT}$) and regulating the termination of other PWM pulses in said positive half cycle as a function of said first control pulses ($\overline{HVT}$), whereby the magnetic flux in said motor is constant regardless of speed and harmonics are reduced in the inverter bridge output voltages.

2. A power supply in accordance with claim 1 wherein said pulse width regulating means modulates the output power of said bridge phases during the negative half cycles of the associated reference waves by PWM pulses which are the complements of those provided during the positive half cycles.

3. A power supply in accordance with claim 2 wherein said pulse width modulation means provides maximum duty PWM pulses for approximately 60 degrees adjacent the midportion of the positive half cycles of the associated reference waves and provides minimum duty PWM pulses for approximately 60 degrees adjacent the midportion of the negative half cycles thereof.

4. A power supply in accordance with claim 1 wherein said inverter bridge (INV) has three phase legs (e.g., $\phi_1$) each of which comprises first (e.g., 1A) and second (e.g., 1B) transistors connected in series across said d.c. source (BR) and first (e.g., 1AD) and second (e.g., 1BD) feedback rectifiers connected in inverse parallel relation respectively with said first and second transistors, and said pulse width modulation means switches said first (e.g., 1A) and second (e.g., 1B) transistors in each said phase leg in opposition so that one is off while the other is conducting.

5. A power supply in accordance with claim 4 wherein said first transistor (e.g., 1A) in each said phase leg is coupled to the positive side of said d.c. source, and said pulse width modulation means controls chopping of current by said first transistor during the positive (A) and negative ($\overline{A}$) half cycles respectively of the corresponding phase reference wave by trains of transistor switching pulses (1a, 1b) which are complements of each other.

6. A power supply in accordance with claim 5 wherein said pulse width modulation means terminates the PWM voltage pulses conducted by said first transistor (e.g., 1A) during the first 30 degrees and during the last 30 degrees of the positive half cycle (e.g., A) of the corresponding phase reference wave approximately at said second control pulses ($\overline{LVT}$) to thereby derive narrower (b width) PWM pulses and also controls said first transistor during the first 30 degrees and during the last 30 degrees of the negative half cycle ($\overline{A}$) of said corresponding phase reference wave by pulses (w-b) which are the inverse of those applied to said first transistor during said positive half cycle of said corresponding reference wave.

7. A power supply in accordance with claim 6 wherein said pulse width modulation means terminates other PWM voltage pulses conducted by said first transistor during the portion of said corresponding phase reference wave positive half cycle occurring between said first 30 degrees and last 30 degrees approximately at said first control pulses ($\overline{HVT}$) to thereby derive wider (a width) PWM pulses and controls said first transistor during the portion of said reference wave negative half cycle ($\overline{A}$) between said first 30 degrees and last 30 degrees by pulses which are the complements of those applied to said first transistor during such portion of said reference wave positive half cycle.

8. A power supply in accordance with claim 7 wherein said pulse width modulation means provides maximum duty cycle PWM pulses from said first transistor during approximately 60 degrees of said positive half cycle (e.g., A) of the corresponding phase reference wave and provides minimum duty cycle PWM pulses during approximately 60 degrees of the negative half cycle (e.g., $\overline{A}$) thereof.

9. A power supply in accordance with claim 8 wherein said pulse width modulation means provides maximum duty cycle PWM pulses from said first transistor (e.g., 1A) during approximately 60 degrees midway of said positive half cycle (e.g., A) of said corresponding phase reference wave.

10. A supply power in accordance with claim 4 and including interval generator means (IG) for deriving three trains of step controlling signals (H1, H2, H3) each of which corresponds to one of said phase reference waves and spans respective zero crossings of said corresponding phase reference wave.

11. A power supply in accordance with claim 10 and including volt-second switch means (VSS) for deriving three trains of duty cycle regulating pulses (VT1, VT2, VT3) each of which is associated with one phase (e.g., $\phi_1$) of said inverter bridge and the corresponding reference wave (e.g., A) and whose leading edges are at said first control pulse ($\overline{HVT}$) when the corresponding step controlling signal (e.g., H1) is absent and at said second control pulse ($\overline{LVT}$) when it is present, the trailing edges of said duty cycle regulating pulses (e.g., VT1) being at the succeeding clock pulses (f1).

12. A power supply in accordance with claim 11 wherein said volt-second switch means (VSS) provides a signal (VT) to said OR-circuit means (D27-D28) to reset said volt/hertz integrator means (RI) in response to each said first control pulse ($\overline{HVT}$).

13. A power supply in accordance with claim 12 wherein said step controlling signals are of approximately 60° width.

14. A power supply in accordance with claim 11 and including modulation logic means (ML) for generating three trains of transistor switching pulses (1a, 2a, 3a) each of which is associated with one phase of said inverter bridge and regulates the switching of said first transistor (e.g., 1A) in said one phase (e.g., $\phi_1$) and which follows the complement (e.g., $\overline{VT1}$) of said corresponding train of duty cycle regulating pulse (VT1) during the positive half cycle (A) of the corresponding phase reference wave and follows said train of duty cycle regulating pulses (VT1) during the negative half cycle ($\overline{A}$) of said corresponding phase reference wave.

15. A power supply in accordance with claim 14 wherein said modulation logic means also generates three trains of pulses (1b, 2b, 3b) which are the complements of said trains of transistor switching pulses (1a, 1b, 1c) and each of which (e.g., 1b) regulates the switching of said second transistor (e.g., 1B) in the associated phase leg (e.g., $\phi_1$) of said bridge inverter.

16. A power supply in accordance with claim 14 wherein said modulation logic means also superimposes a pulse of approximately 60° duration on said train of transistor switching pulses (e.g., 1a) during the positive half cycle (A) of the corresponding phase reference wave and omits pulses for approximately 60° from said train of transistor switching pulses (1a) during the negative half cycle ($\overline{A}$) of said corresponding phase reference wave.

17. A variable frequency and variable voltage power supply in accordance with claim 1 and including motor stator voltage versus frequency setting means (R59) for selectively adjusting the slope of said ramp pulses ($v_{c14}$) to thereby vary the frequency range over which the maximum output torque of said motor is approximately constant.

18. A variable frequency and variable voltage power supply in accordance with claim 1 and including harmonic setting means (R77) for selectively varying the magnitude of said second reference voltage to thereby regulate the percent of fifth and seventh harmonics in the currents to said motor.

19. A variable frequency and variable voltage power supply in accordance with claim 4 and including
a frequency divider (DIV) for providing a first train of timing pulses (f1'/6) whose frequency is equal to the quotient of the frequency of said clock pulses divided by an integer, and wherein said three phase generator (GEN) includes a plurality of masterslave flip-flops (FF1, FF2, FF3 - FIG. 9) arranged in a ring and each of which receives said first timing pulses (f1'/6) on its clock input.

20. A variable frequency and variable voltage power supply in accordance with claim 19 wherein said frequency divider provides first and second trains of timing pulses (f1'/6, f1''/6) each of whose frequency is equal to the quotient of the frequency of said clock pulses divided by an integer and the timing pulses of said first and second trains are displaced 180° in phase, and including interval generator means (IG) receiving said second train of timing pulses (f1''/6) and said three phase reference waves (A, B, C) as inputs for deriving three sets of step controlling signals (H1, H2, H3) each of which corresponds to one of said phase reference waves (A, B, or C) and spans respective positive-going and negative-going zero crossings of said corresponding phase reference wave.

21. A variable frequency and variable voltage power supply in accordance with claim 20 and including voltsecond switch means (VSS) for deriving three trains of duty cycle regulating pulses (VT1, VT2, VT3) each of which trains is associated with one phase of said bridge inverter (e.g., $\phi_1$) and the corresponding phase reference wave (e.g., A), the leading edges of said duty cycle regulating pulses being at said first control pulse ($\overline{HVT}$) when the corresponding step controlling signal (e.g., H1) is absent and at said second control pulse ($\overline{LVT}$) when it is present, the trailing edges of said duty cycle regulating pulses (VT1, VT2, VT3) being at the succeeding clock pulses (f1).

22. A variable frequency and variable voltage power supply in accordance with claim 21 and including modulation logic means (ML) receiving said three phase reference waves (A, B, C) and said trains of duty cycle regulating pulses (VT1, VT2, VT3) as inputs for generating three trains of transistor switching pulses (1a, 2a, 3a) each of which corresponds to one of said reference waves (e.g., A) and to an individual phase (e.g., $\phi_1$) of said bridge inverter for regulating the switching of said first transistor (e.g., 1A) of said corresponding phase, each of said train of transistor switching pulses (e.g., 1a) following the corresponding train of duty cycle regulating pulses (VT1) during the negative half cycle ($\overline{A}$) of the corresponding phase reference wave and following the complement of said train of duty cycle regulating pulses ($\overline{VT1}$) during the positive half cycle (A) of the corresponding phase reference wave.

23. A variable frequency and variable voltage power supply in accordance with claim 22 wherein said modulation logic means (ML) for generating said trains of transistor switching pulses (VT1, VT2, VT3) also superimposes a pulse of approximately 60° duration on said complement of said train of duty cycle regulating pulses (e.g., $\overline{VT1}$) during the positive half cycle (e.g., A) of the corresponding phase reference wave and omits pulses for approximately 60° from said train of duty cycle regulating pulses (e.g., VT1) during the negative half cycle (e.g., $\overline{A}$) of said corresponding phase reference wave.

24. A power supply in accordance with claim 23 wherein said modulation logic means (ML) also generates the complements (1b, 2b, 3b) of said trains of transistor switching pulses (1a, 2a, 3a) and each of which complement (e.g., 1b) regulates conduction by said second transistor (e.g., 1B) in the corresponding phase leg of said bridge inverter.

25. A power supply in accordance with claim 1 wherein the magnitude of said second reference voltage is equal to approximately 0.732 times the magnitude of said first reference voltage.

26. A harmonic-reduced, variable frequency and variable voltage power supply for a three phase a.c. motor comprising, in combination, a three phase bridge inverter having three phase legs each of which comprises first and second transistors connected in series across a d.c. power source and first and second feedback rectifiers connected in inverse parallel relation with said first and second transistors respectively, oscillator means for generating a succession of clock pulses whose frequency is a function of an analog speed signal, resettable volt/hertz integrator means for deriving a train of ramp pulses which are synchronized to said clock pulses and whose instantaneous magnitude varies as a function of the integral of the output voltage of said bridge inverter with respect to time, first and second comparators for deriving first ($\overline{HVT}$) and second ($\overline{LVT}$) control pulses when the voltage of each said ramp pulse becomes equal respectively to first and second reference voltages of different magnitude, means for disabling said integrator means at said first control pulse and for holding it disabled until the succeeding clock pulse, three phase generator means for deriving three phase reference waves (A, B, C) displaced 120° whose edges are synchronized to said clock pulses and each of which has a period equal to the time required to generate a predetermined number of said clock pulses and has positive and negative half cycles, interval generator (IG) means for deriving three trains of step controlling signals (H1, H2, H3) each of which corresponds to one of said phase reference waves and which step controlling signals span respective zero crossings of said corresponding phase reference wave, volt-second switch means for deriving three trains of duty cycle regulating pulses (VT1, VT2, VT3) each of which is associated with one phase of said inverter bridge and which duty cycle regulating pulses have leading edges at said first control pulse $\overline{HVT}$ when the corresponding step controlling signal is absent and at said second control pulse ($\overline{LVT}$) when the corresponding step controlling signal is present and whose trailing edges are at the succeeding clock pulse, and modulation means for generating three trains of transistor switching pulses (1a, 1b, 1c) each of which regulates the switching of said first transistor in one phase of said inverter bridge and which follows the complement (e.g., $\overline{VT1}$) of said train of duty cycle regulating pulses during the positive half cycle (e.g., A) of the corresponding phase reference wave and follows said train (e.g., VT1) of duty cycle regulating pulses during the negative half cycle (e.g., $\overline{A}$) of the corresponding phase reference wave.

27. A power supply in accordance with claim 26 wherein said modulation logic means also derives the complements of said trains of transistor switching pulses and each said complement regulates conduction of said second transistor in the associated phase of said inverter bridge.

28. A harmonic-reduced variable frequency and variable voltage power supply for a three phase a.c. motor (M) comprising a three phase bridge inverter bridge (INV) having three phase legs each of which comprises first (e.g., 1A) and second (e.g., 1B) transistors connected in series across a d.c. power source (BR) and first (1AD) and second (1BD) feedback rectifiers connected in inverse parallel relation with said first and second transistors respectively, oscillator means (VCO) for generating a succession of clock pulses (f1) whose frequency is a function of an analog speed signal, resettable volt/hertz integrator means (RI) for deriving a train of ramp pulses ($v_{ci4}$) which are synchronized to said clock pulses and whose instantaneous magnitude varies as a function of the integral of the output voltage of said bridge inverter with respect to time, first (LC1) and second (LC2) comparators for deriving first ($\overline{HVT}$) and second ($\overline{LVT}$) control pulses when the voltage of each said ramp pulse becomes equal respectively to first and second reference voltages, means (Q13) for disabling said integrator means at said first control pulse and for holding it disabled until the succeeding clock pulse, a frequency divider (DIV) for generating trains of first ($f1'/6$) and second ($f1''/6$) timing pulses each of whose frequency is equal to the quotient of the frequency of said clock pulses divided by an integer and which are displaced 180° in phase, three phase generator means (GEN) receiving said train of first timing pulses ($f1'/6$) as an input for deriving three phase reference waves (A, B, C) displaced 120° whose edges are synchronized to said clock pulses and each of which has a 360° period equal to the time required to generate a predetermined number of said clock pulses and having positive and negative half cycles, interval generator means (IG) receiving said train of second timing pulses ($f1''/6$) and said three phase reference waves (A, B, C) as inputs for deriving three trains of step controlling signals (H1, H2, H3) each of which corresponds to one of said phase reference waves (A, B, C) and spans respective zero crossings of said corresponding phase reference wave, volt-second switch means (VSS) for deriving three trains of duty cycle regulating pulses (VT1, VT2, VT3) each of which is associated with one phase of said inverter bridge and which duty cycle regulating pulses have leading edges respectively at said first control pulse ($\overline{HVT}$) when the corresponding step controlling signal (e.g., H1) is absent and at said second control pulse ($\overline{LVT}$) when the corresponding step controlling signal is present and whose trailing edges are at the succeeding clock pulse, and modulation means (ML) for generating three trains of transistor switching pulses (1a, 1b, 1c) each of which regulates the switching of said first transistor (e.g., 1A) in one phase (e.g., $\phi_1$) of said inverter bridge and which follows the complement (e.g., $\overline{VT1}$) of said train of duty cycle regulating pulses during the positive half cycle (e.g., A) of the corresponding phase reference wave and follows said train of duty cycle regulating pulses (VT1) during the negative half cycle (A) of the corresponding phase reference wave.

29. Chopping pulse generating means for an n-phase bridge inverter having first and second series-connected transistors in each phase leg adapted to be connected across a d.c. source, comprising, in combination, oscillator means for generating a succession of clock pulses ($f1$) whose frequency is a function of an analog speed signal, resettable volt/hertz integrator means (RI) for deriving ramp pulses ($v_{c14}$) which are synchronized to said clock pulses and whose instantaneous magnitude varies as a function of the integral of the output voltage from said inverter with respect to time, first (LC1) and second (LC2) comparators for deriving first ($\overline{HVT}$) and second ($\overline{LVT}$) control pulses when said ramp pulses become equal respectively to first and second reference voltages of different magnitude, n-phase generator means (GEN) for deriving n-phase reference waves (A, ... N) displaced $360/n$ degrees apart having edges synchronized to said clock pulses ($f1$) and each of which is associated with one phase leg of said inverter bridge and has a 360° period which includes a predetermined number of said clock pulses and has positive and negative half cycles, interval generator means (IG) for deriving n trains of step controlling signals (H1, ... Hn) each of which corresponds to one of said reference waves (A, ... N) and spans respective zero crossings thereof, volt-second switch means (VSS) for deriving n trains of duty cycle regulating pulses (VT1, ... VTn) each of which corresponds to one of said reference waves (A, ... N) and which pulses have leading edges at said first control pulse ($\overline{HVT}$) and at said second control pulse ($\overline{LVT}$) respectively when the corresponding step controlling signal (e.g., H1) is absent and is present, the trailing edges of said duty cycle regulating pulses being at the succeeding clock pulses, and modulation logic means for deriving n trains of harmonic-reduced transistor switching pulses ($1a ... na$) each of which corresponds to one of said reference waves and regulates said first transistor (e.g., 1A) in the associated inverter phase leg (e.g., $\phi_1$) and follows the complement (e.g., $\overline{VT1}$) of said train of duty cycle regulating pulses during the positive half cycle of the corresponding reference wave (e.g., A) and follows said train (e.g., VT1) of duty cycle regulating pulses during the negative half cycle of said corresponding reference wave, said modulation logic means also deriving the complements ($1b, ... nb$) of said trains of transistor switching pulses which respectively control said second transistors in the associated inverter phase legs.

* * * * *